April 5, 1955 W. S. DRUZ 2,705,740

SUBSCRIPTION TYPE SIGNALLING SYSTEM

Filed Dec. 14, 1949

14 Sheets-Sheet 1

WALTER S. DRUZ
INVENTOR.

BY Francis W. Crotty
HIS ATTORNEY

WALTER S. DRUZ
*INVENTOR.*
BY Francis W. Crotty
HIS ATTORNEY

WALTER S. DRUZ
*INVENTOR.*

BY Francis W. Crotty
HIS ATTORNEY

WALTER S. DRUZ,
*INVENTOR.*

BY Francis W. Crotty
HIS ATTORNEY

WALTER S. DRUZ
*INVENTOR.*

BY Francis W. Crotty
HIS ATTORNEY

WALTER S. DRUZ
INVENTOR.
BY Francis W. Crotty
HIS ATTORNEY

WALTER S. DRUZ.
*INVENTOR.*
BY Francis W. Crotty
HIS ATTORNEY

WALTER S. DRUZ
*INVENTOR.*

BY Francis W. Crotty
HIS ATTORNEY

WALTER S. DRUZ
*INVENTOR.*
BY Francis W. Crotty
HIS ATTORNEY

WALTER S. DRUZ
*INVENTOR.*

BY Francis W. Crotty
HIS ATTORNEY

April 5, 1955 W. S. DRUZ 2,705,740

SUBSCRIPTION TYPE SIGNALLING SYSTEM

Filed Dec. 14, 1949

14 Sheets-Sheet 11

WALTER S. DRUZ
*INVENTOR.*

BY Francis W. Crotty

HIS ATTORNEY

April 5, 1955

W. S. DRUZ 2,705,740

SUBSCRIPTION TYPE SIGNALLING SYSTEM

Filed Dec. 14, 1949

14 Sheets-Sheet 12

WALTER S. DRUZ
*INVENTOR.*

BY Francis W. Crotty

HIS ATTORNEY

WALTER S. DRUZ
INVENTOR.
BY Francis W. Crotty
HIS ATTORNEY

WALTER S. DRUZ
*INVENTOR.*

BY Francis W. Crotty
HIS ATTORNEY

United States Patent Office 2,705,740

Patented Apr. 5, 1955

2,705,740

SUBSCRIPTION TYPE SIGNALLING SYSTEM

Walter S. Druz, Chicago, Ill., assignor to Zenith Radio Corporation, a corporation of Illinois Application December 14, 1949, Serial No. 132,936

21 Claims. (Cl. 178—5.1)

This invention relates to subscription-type signalling systems, and more particularly to subscription-type television transmitting and receiving systems.

In the copending application of Francis W. Crotty et al., Serial No. 98,218, filed June 10, 1949, now U. S. Patent No. 2,612,552, issued September 30, 1952, for "Subscription-Type Signalling Systems," and assigned to the present assignee, there is disclosed and claimed a novel system for insuring distribution of a broadcast television signal only to authorized subscribers. In the Crotty et al. application, the composite television signal generated at the transmitter is coded by superimposing a coding signal which is effective to alter the amplitude-range of the video-frequency components relative to the amplitude of the timing-signal components during spaced time intervals. When such a signal is received with a conventional television receiver, the reproduced image is characterized by a disconcerting variation in background level which manifests itself as a flicker effect. In addition, by superposition of the coding signal on the composite television signal, some of the video-frequency components are transposed to the blacker than black region, resulting in false synchronization at the unauthorized receiver which manifests itself as a "tearing-out" of the image.

In order to provide for clear reproduction of the image by an authorized receiver, a key signal, representing the times of occurrence of the spaced time intervals during which the coding signal is added at the transmitter, is sent from the transmitter to a central station for metering to subscribers on request. Preferably, an existing telephone exchange is used for distribution of the key signal. A subscriber desiring to view a coded program merely places a call to the central telephone exchange and requests the desired key signal, and an appropriate charge is made on the subscriber's bill at the end of the month. The subscriber's receiver contains decoding apparatus which responds to the key signal to develop a decoding signal which is complementary to the coding signal used at the transmitter, and to superpose the decoding signal on the received coded composite television signal.

It is a primary object of the present invention to provide a novel subscription type television system similar in some respects to that disclosed and claimed in the above-identified Crotty et al. application, but in which more complete coding is effected to preclude intelligible reproduction of the broadcast image by an unauthorized receiver.

In accordance with the present invention, more complete coding is accomplished by reducing the amplitude of the timing signals during the same spaced time intervals that the amplitude of the video-frequency components is increased. For example, in a preferred embodiment, the amplitude of the line-frequency synchronizing-signal components is reduced to a value at or below black level of the composite television signal, and the maximum amplitude of the video-frequency components is increased to a value corresponding to the synchronizing-signal peak-amplitude during normal transmission. Preferably, for maximum secrecy, coding of this type is effected during randomly spaced time intervals of random duration. The coded composite television signal is radiated in the usual manner, and a key signal, indicating the times of occurrence of the spaced time intervals during which the composite television signal is altered, is transmitted by wire line to a central distribution station for metering to authorized subscribers.

The effect of the type of coding provided by the present invention on image reproduction at an unauthorized receiver is to cause the receiver to lose all line-frequency synchronization during spaced intervals, even if the receiver is equipped with an automatic frequency control system. In fact, since the video-frequency signals are transposed into the blacker than black region, the line-frequency sweep system at an unauthorized receiver misinterprets some of the video-frequency components as synchronizing-signal components, and scanning synchronization is completely destroyed. In addition, since the amplitude of the video-frequency components is altered as in the Crotty et al. system, any information which is reproduced on the screen of the receiver is subject to the same disconcerting flicker which is characteristic of the Crotty et al. system.

However, at an authorized receiver supplied with the proper key signal from the central station, a decoding signal, which is complementary to the coding signal used at the transmitter, is developed and superposed on the coded composite television signal received over the air, so that proper image reproduction is obtained.

In accordance with another feature of the invention, in order to obtain even more complete coding, the field-frequency synchronizing-signal components are also reduced in peak amplitude during spaced time intervals to a value less than black level. Preferably, the intervals during which the line-frequency synchronizing-signal components are reduced in amplitude and during which the video-frequency components are increased in amplitude are differently spaced and of different duration than the intervals during which the field-frequency synchronizing-signal components are suppressed. The effect of such further coding is to cause an unauthorized receiver to lose field-frequency synchronization as well as line-frequency synchronization, and the image reproduced on the screen becomes a complete scramble.

When such a complex coding arrangement is used at the transmitter to alter two different characteristics of the radiated composite television signal during differently spaced time intervals, it is preferred, in accordance with the invention, that two different characteristics of the key signal be modulated to indicate respectively the times of occurrence of the overlapping groups of spaced time intervals during which a coding change is effected. For example, the amplitude of the key signal may be modulated to indicate the times of occurrence of the spaced time intervals during which the line-frequency synchronizing-signal components are suppressed and the video-frequency components are increased in amplitude, and the frequency of the key signal may be modulated to indicate the times of occurrence during which the field-frequency synchronizing signal components are suppressed. The key signal channel of an authorized receiver is provided with means for deriving from the doubly-modulated key signal the required information for developing the decoding signal.

Thus, the present invention provides a subscription-type television system including a transmitter and a receiver. The transmitter comprises a video-frequency signal generator, such as an iconoscope or an image orthicon, and an associated scanning system for controlling the video-frequency signal generator to develop during recurrent trace intervals video-frequency signals, of varying amplitude within a predetermined amplitude-range, representing a scanned subject. The scanning system also includes a timing-signal generator for developing timing signals during interposed intervals. A mixer device is coupled to the video-frequency generator and to the scanning system to produce a composite television signal which includes the video-frequency signals and the timing signals with the timing signals normally having a fixed peak amplitude greater than any amplitude within the video-frequency signal amplitude-range. The coding apparatus at the transmitter includes a first pulse generator for developing during spaced time intervals a first coding signal comprising pulses of one polarity, and a second pulse generator for developing during the same spaced time intervals a second coding signal comprising pulses, in substantial time coincidence with the timing-signal intervals, of polarity opposite to that of the first coding signal and of an amplitude greater than that of the first coding signal. Means are also provided in the coding apparatus for superposing the first and second coding signals on the composite television signal to provide a coded television signal. A key-signal generator is provided for developing a key signal indicating the times of occurrence of the spaced time intervals during which the coding signals are added to the composite signal. Means are provided for transmitting the coded television signal over a first transmission path, and for transmitting the key signal over a second transmission path.

The subscriber's receiver includes decoding apparatus comprising a first pulse generator, and means responsive to the key signal for actuating the first pulse generator to develop during spaced coding intervals a first decoding signal substantially complementary with the first coding signal. The decoding apparatus also comprises a second pulse generator, and means responsive to the key signal for actuating the second pulse generator to develop during the same coding intervals a second decoding signal substantially complementary with the second coding signal. The decoding apparatus further comprises means for superposing the first and second decoding signals on the coded composite signal to provide a decoded composite television signal. Means are also provided at the receiver for utilizing the decoded television signal to reproduce an image of the scanned subject.

The features of the present invention which are believed to be novel are set forth with particularity in the appended claims. The invention, together with further objects and advantages thereof, may best be understood, however, by reference to the following description taken in connection with the accompanying drawings, in the several figures of which like reference numerals indicate like elements, and in which:

Figure 1:
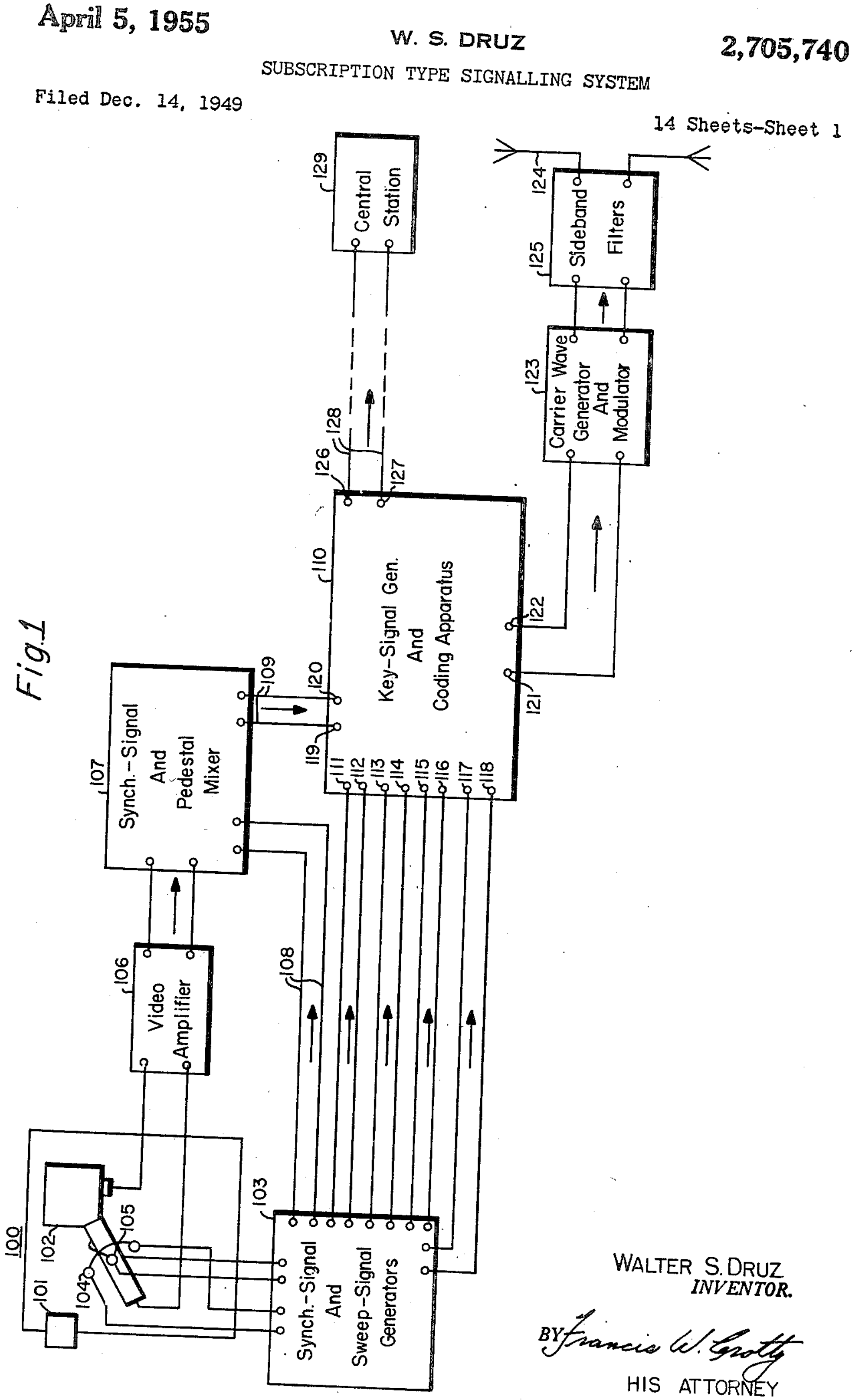
Figure 1 is a schematic block diagram of a subscription-type television transmitter constructed in accordance with the present invention.
Figure 4:
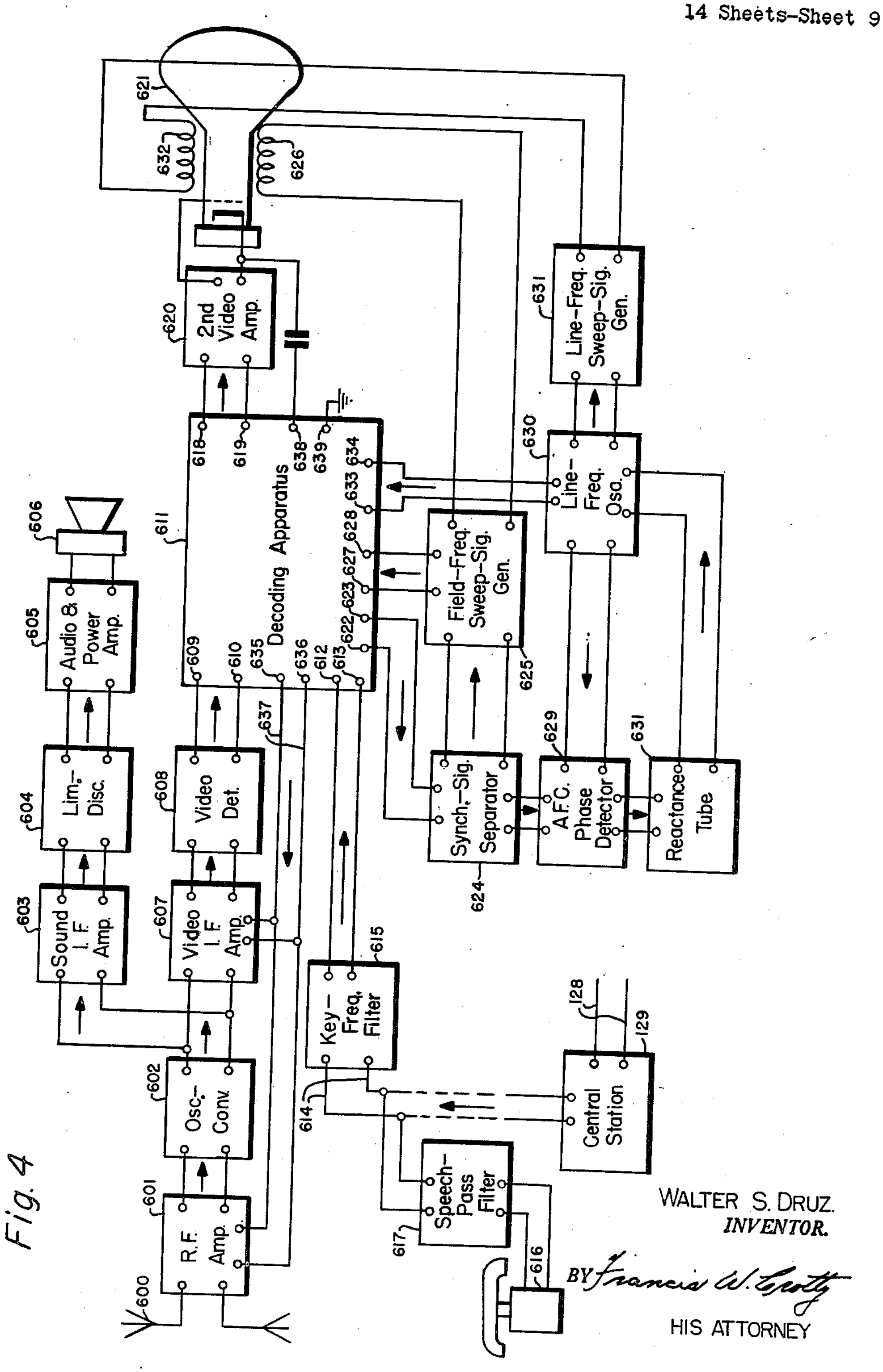
Figure 5A:
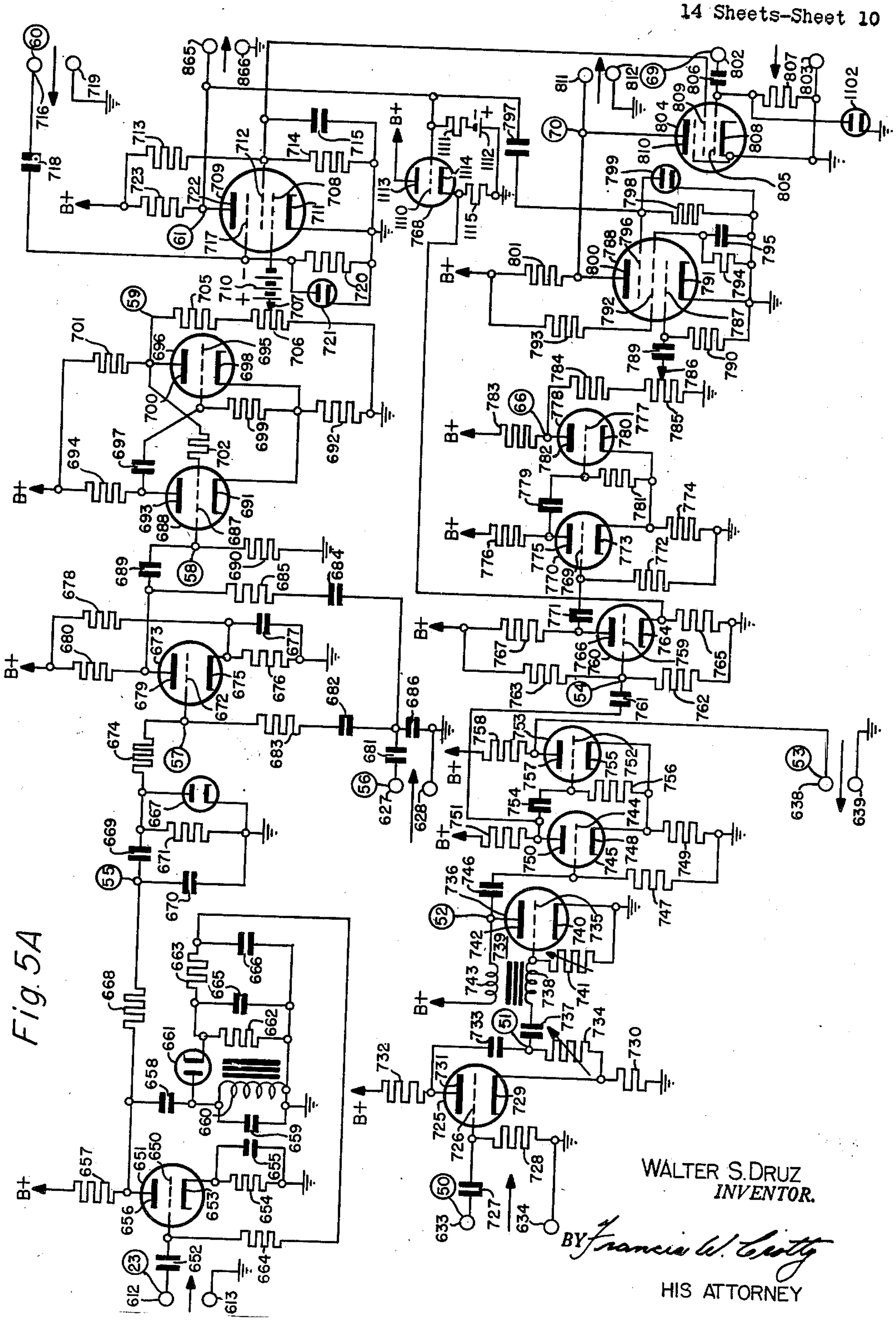
Figure 5B:
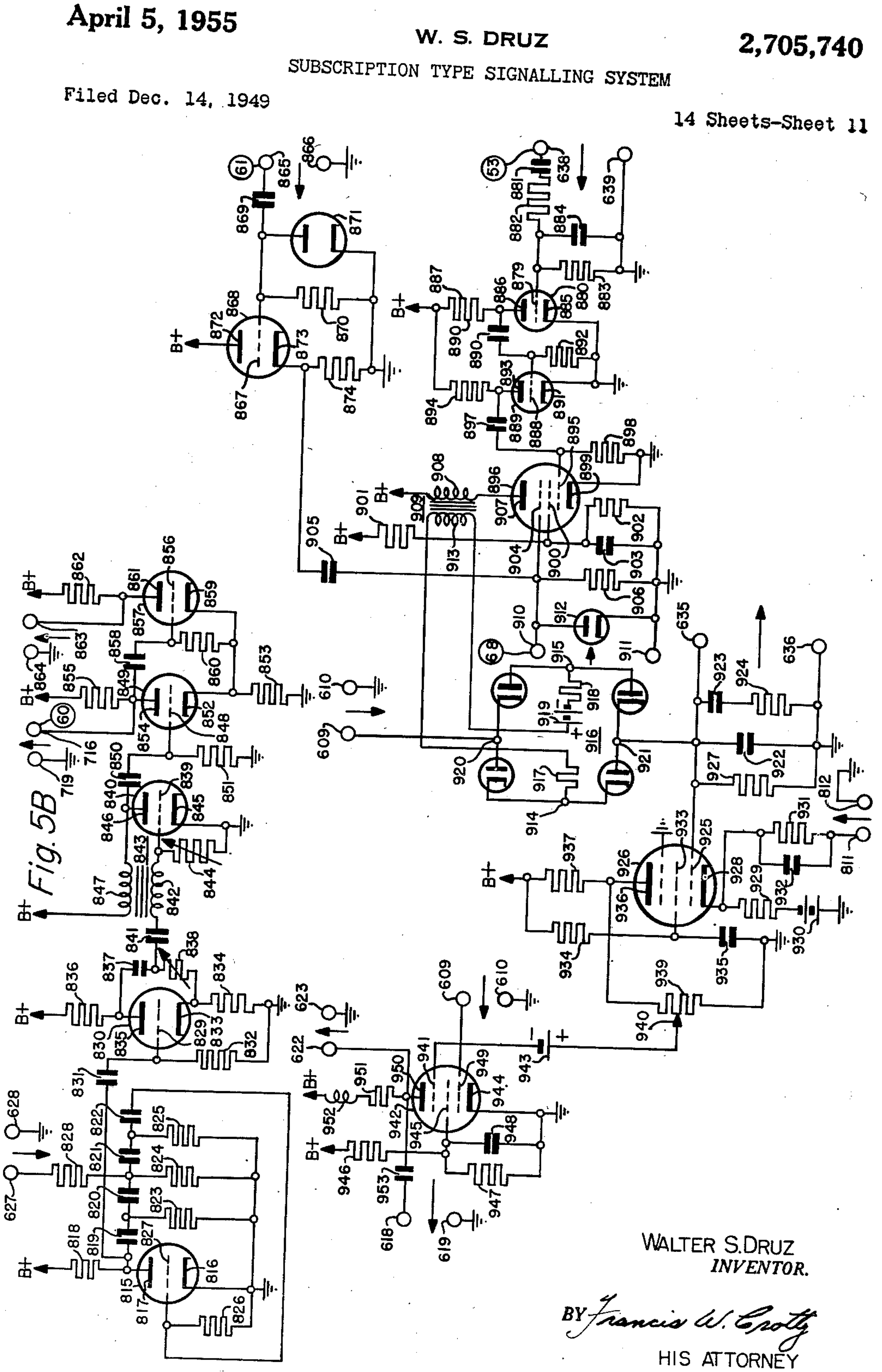
Figures 5C, 6A:
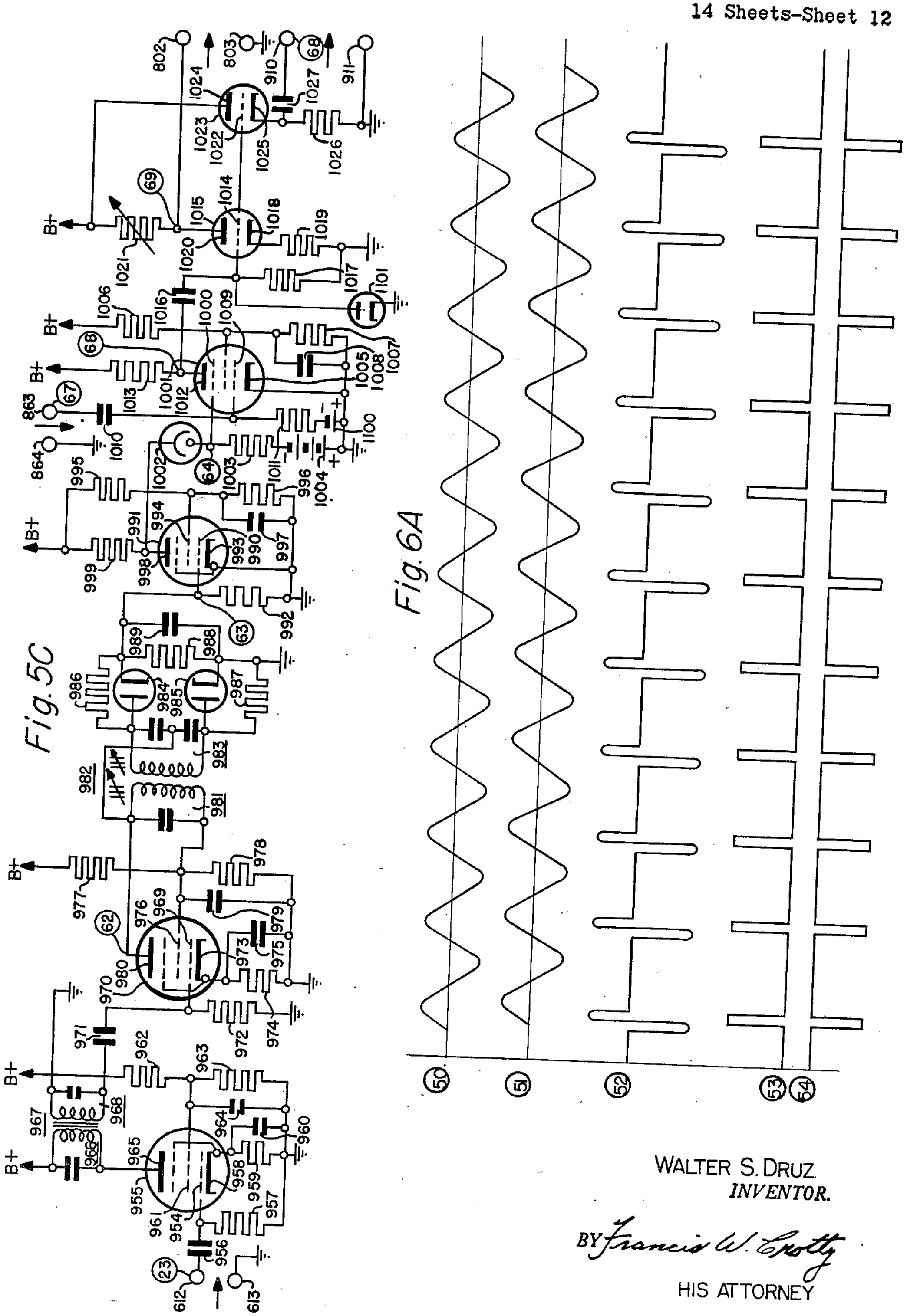
Figure 6B:
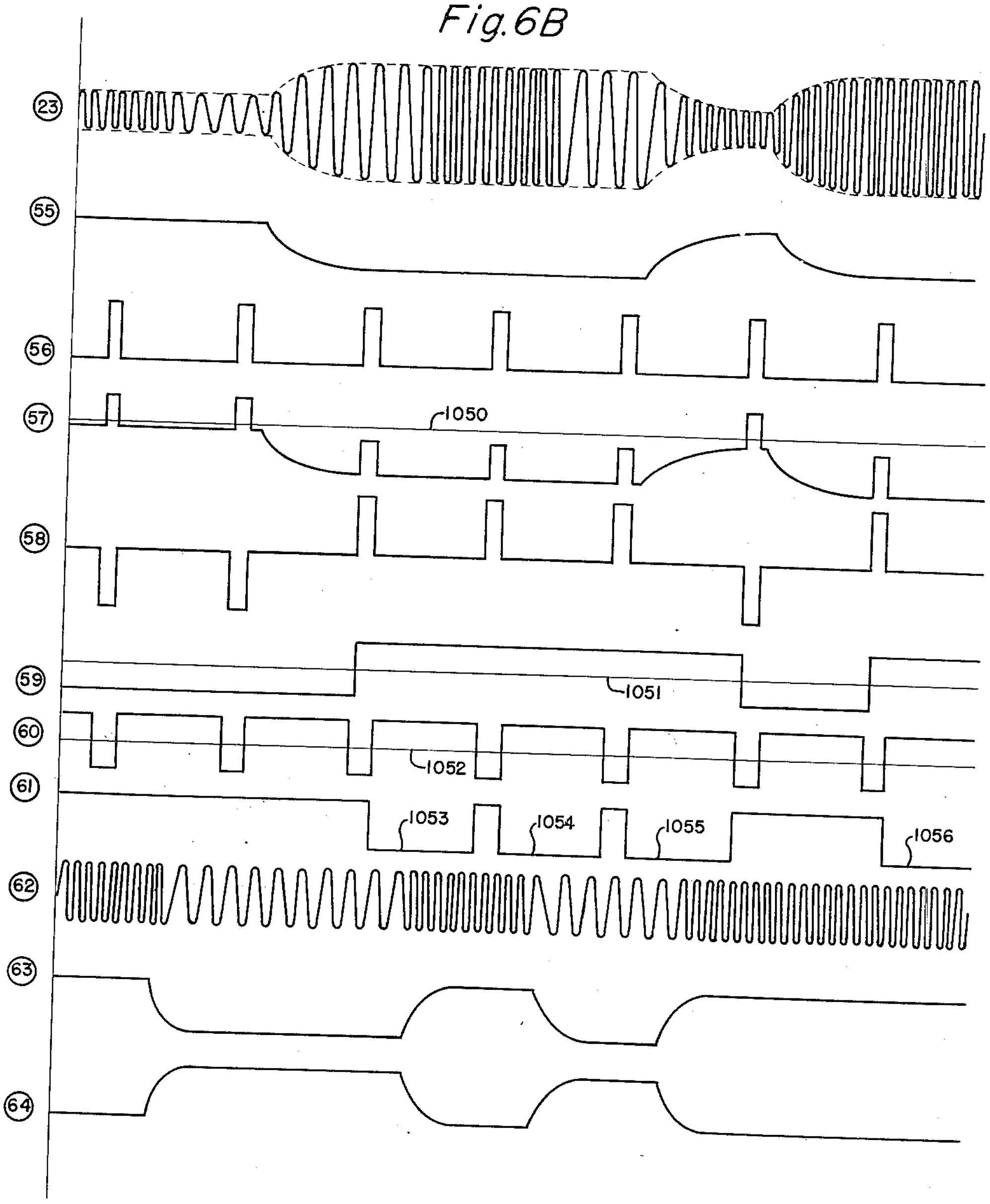
Figure 6C:
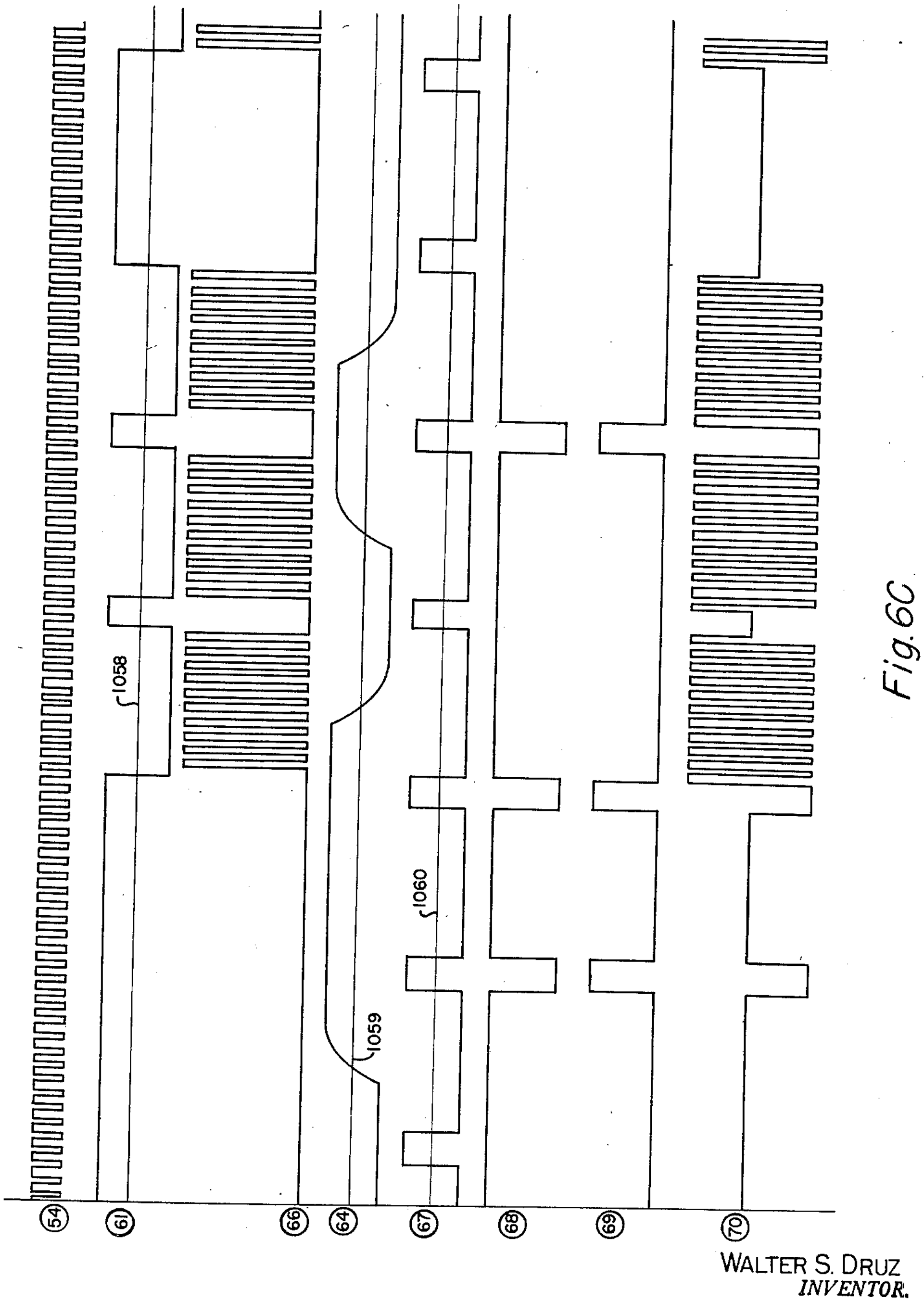

Figures 3A, 3B, 3C, 3D, and 3E are idealized graphical waveform representations useful in understanding the operation of the transmitter of Figure 1;

Figure 4 is a schematic block diagram of a subscription-type television receiver constructed in accordance with the present invention;

Figures 5A, 5B, and 5C are schematic circuit diagrams of one form of decoding apparatus which may be embodied in the receiver of Figure 4; and Figures 6A, 6B, and 6C are idealized graphical waveform representations useful in understanding the operation of the receiver of Figure 4.

In the ensuing description, and in the appended claims, it is convenient to speak in terms of coding a composite television signal during spaced time intervals by superposition of a coding signal. In its preferred embodiment, the invention contemplates transmission of the composite signal alternately in a normal mode and in an altered or coded mode, although the invention also contemplates a system in which the composite television signal is coded continuously. Thus, the term "coded composite television signal" is used to describe the coded signal, whether coding is continuous or intermittent.

Figure 1 is a schematic block diagram of a subscription type television transmitter embodying the present invention. The transmitter comprises a video-frequency signal generator 100 which includes a lens system 101 and a picture-converting device 102, such as an iconoscope or an image orthicon. Synchronizing-signal and sweep-signal generators 103 provide line-frequency and field-frequency scanning signals for the line-frequency and field-frequency deflection coils 104 and 105, respectively, to control generator 100 to develop during recurrent trace intervals video-frequency signals representing a scanned subject (not shown). Video-frequency signals produced by picture-converting device 102 and its associated scanning system are passed through a video amplifier 106 to a synchronizing-signal and pedestal mixer device 107, where they are mixed with timing signals received from generator 103 over leads 108 to provide a composite television signal with the timing signals normally of greater peak amplitude than any of the video-frequency components. Thus, the output of mixer device 107, appearing on leads 109, represents a signal identical with that which, after modulation on a radio-frequency carrier wave is radiated from a conventional non-subscription type television transmitter.

The timing-signal generator 103 associated with video-frequency generator 100 is coupled to a key-signal generator and coding apparatus 110. In the illustrated embodiment, field-frequency drive pulses of negative polarity are applied from timing-signal generator 103 to input terminals 111 and 112 of coding apparatus 110. Similarly, input terminals 113 and 114 are provided with field-frequency drive pulses of positive polarity, terminals 115 and 116 are provided with field-frequency pedestal pulses of positive polarity, and terminals 117 and 118 are provided with line-frequency blanking pedestals of positive polarity. Coding apparatus 110 operates to produce a coding signal and to superpose such coding signal on the composite television signal appearing between terminals 119 and 120 connected to leads 109 from mixer 107. The coded composite television signal appearing between terminals 121 and 122 of coding apparatus 110 is supplied to a carrier-wave generator and modulator 123, and the resulting radio-frequency wave, modulated in accordance with the coded composite television signal, is radiated by means of an antenna 124 after being passed through the conventional side band filters 125.

Apparatus 110 also operates to generate a key signal indicative of the times of occurrence of the coding intervals. The key signal appears between terminals 126 and 127 and is impressed upon a line circuit 128 extending to a central station 129 for distribution to authorized subscribers.

To provide maximum secrecy, it is preferred that coding be effected only during spaced time intervals, and that a normal or uncoded signal be radiated during intermediate intervals. However, the invention is not limited to such an arrangement, but also contemplates continuous transmission of a coded signal. Furthermore, it is preferred that the coding intervals be of random duration and commence at random times, although a predetermined repetitive coding schedule may be used.

Video-frequency signal generator 100, synchronizing-signal and sweep-signal generator 103, video amplifier 106, mixer device 107, carrier-wave generator and modulator 123, and sideband filter 125 may all be of conventional construction. The constructional and operational details of key-signal generator and coding apparatus 110 are illustrated in exemplary form in Figures 2A, 2B, 2C, and 2D.

Figures 2A, 2B:
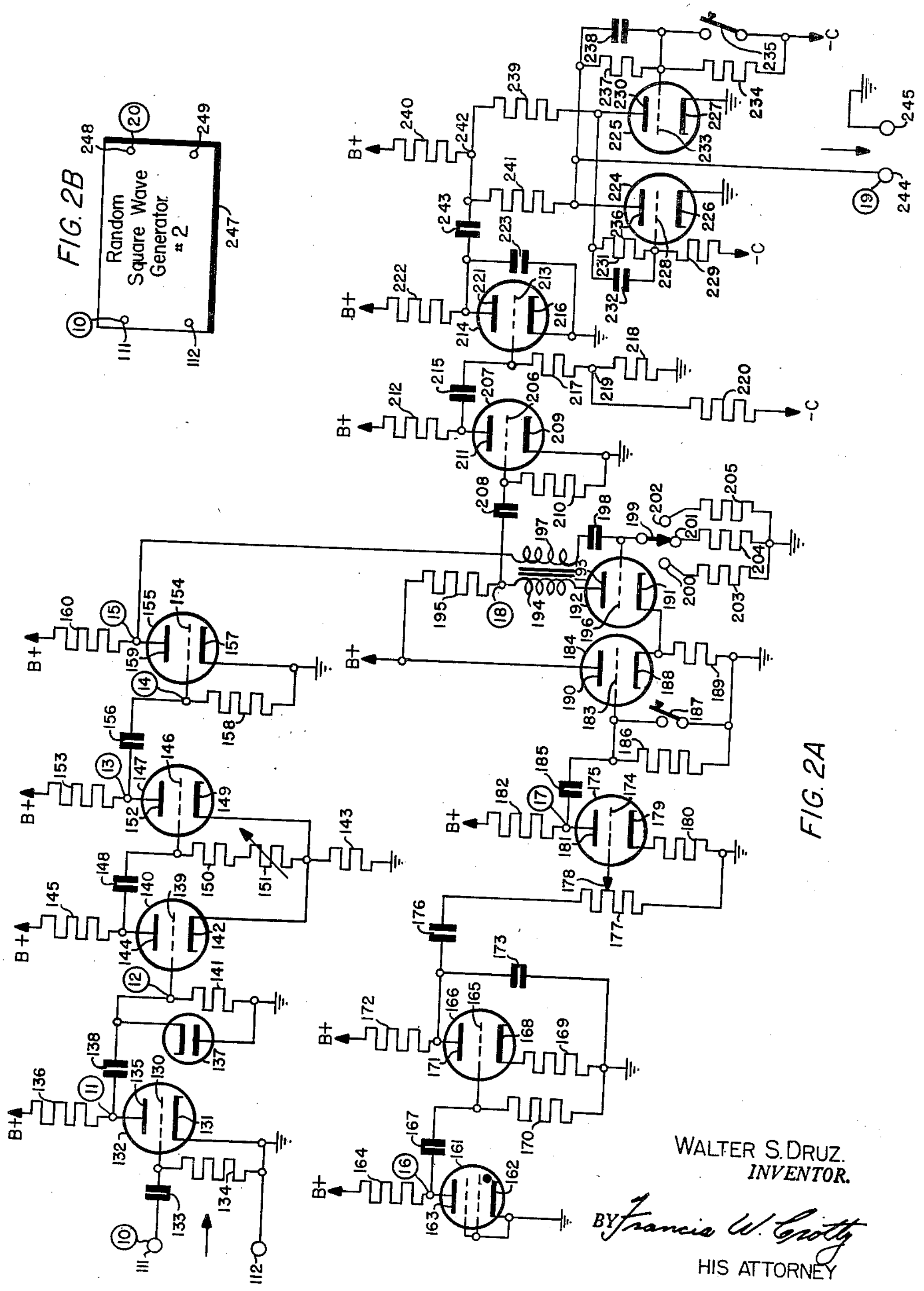
Figures 2A, 2B, 2C and 2D are schematic circuit diagrams of one form of coding apparatus which may be embodied in the transmitter of Figure 1.

In Figure 2A, field-frequency drive pulses of negative polarity appearing between terminals 111 and 112 are applied between the control grid 130 and the cathode 131 of an electron-discharge device 132 by means of an input circuit comprising a coupling condenser 133 and a grid resistor 134. Cathode 131 is directly connected to ground. The anode 135 of electron-discharge device 132 is connected to the positive terminal of a suitable source of unidirectional operating potential, conventionally designated B+, by means of a load resistor 136. Anode 135 is also coupled to the cathode of a rectifier device 137 by means of a coupling condenser 138, the anode of rectifier 137 being connected to ground. The cathode of rectifier 137 is also connected to the control grid 139 of an electron-discharge device 140, control grid 139 being connected to ground through a grid resistor 141.

The cathode 142 of device 140 is connected to ground through a resistor 143, and the anode 144 of device 140 is connected to B+ through a load resistor 145. Anode 144 is also coupled to the control grid 146 of a further electron-discharge device 147 by means of a coupling condenser 148. The cathode 149 of device 147 is directly connected to cathode 142 of device 140, and control grid 146 is returned to cathode 149 by means of the series combination of a fixed resistor 150 and a variable resistor 151. The anode 152 of device 147 is connected to B+ through a load resistor 153.

Anode 152 is coupled to the control grid 154 of an electron-discharge device 155 by means of a coupling condenser 156. The cathode 157 of device 155 is directly connected to ground, and control grid 154 is returned to cathode 157 by means of a grid resistor 158. The anode 159 of device 155 is connected to B+ through a load resistor 160.

In another portion of the circuit, an electron-discharge device 161, which may be of the gas-filled type, is arranged to function as a random noise generator. To this end, the cathode 162 of device 161 is grounded, and the anode 163 of device 161 is connected to B+ through a load resistor 164.

Anode 163 is coupled to the control grid 165 of an electron-discharge device 166 by means of a coupling condenser 167. The cathode 168 of device 166 is connected to ground through a cathode resistor 169, and control grid 165 is returned to ground by means of a grid resistor 170. The anode 171 of device 166 is connected to B+ through a load resistor 172. Anode 171 is bypassed to ground for high frequencies by means of a condenser 173.

Anode 171 of device 166 is coupled to the control grid 174 of an electron-discharge device 175 by means of a coupling condenser 176 and a potentiometer resistor 177, the movable tap 178 of which is directly connected to control grid 174 and one terminal of which is grounded, so that a portion of resistor 177 serves as a direct current return for control grid 174. The cathode 179 of device 175 is connected to ground through a resistor 180. The anode 181 of device 175 is connected to B+ through a load resistor 182.

Anode 181 is coupled to control grid 183 of an electron-discharge device 184 by means of a coupling condenser 185, and control grid 183 is connected to ground through a grid resistor 186. A single-pole single-throw switch 187 is also connected between control grid 183 and ground. The cathode 188 of device 184 is connected to ground through a cathode resistor 189, and the anode 190 of device 184 is directly connected to B+. Cathode 188 is directly connected to the cathode 191 of an additional electron-discharge device 192. The anode 193 of device 192 is connected to B+ through the secondary winding 194 of a blocking transformer and through a load resistor 195.

Anode 159 of device 155 is coupled to the control grid 196 of device 192 through the primary winding 197 of the blocking transformer; and a coupling condenser 198 is interposed between primary winding 197 and control grid 196. Control grid 196 is connected to the movable contact 199 of a switch having three fixed contacts 200, 201, and 202, each of the fixed contacts being connected to ground through resistors 203, 204, 205, respectively. Resistors 203, 204, and 205 are of different values to provide an adjustable bias for electron-discharge device 192.

Output pulses developed across resistor 195 are coupled to the control grid 206 of an electron-discharge device 207 by means of a coupling condenser 208. The cathode 209 of device 207 is directly connected to ground, and control grid 206 is connected to ground through a grid resistor 210. The anode 211 of device 207 is connected to B+ through a load resistor 212.

Anode 211 is coupled to the control grid 213 of an electron-discharge device 214 by means of a coupling condenser 215. The cathode 216 of device 214 is grounded, and control grid 213 is connected to ground through the series combination of a pair of grid resistors 217 and 218. Suitable negative biasing potential is supplied to a point 219 between resistors 217 and 218 from a suitable source, conventionally designated −C, through a voltage dropping resistor 220. The anode 221 of device 214 is connected to B+ through a load resistor 222. Anode 221 is bypassed to ground for high frequencies by means of a condenser 223.

A pair of electron-discharge devices 224 and 225 are arranged in an Eccles-Jordan trigger circuit. The cathodes 226 and 227 of devices 224 and 225, respectively, are grounded. The control grid 228 of device 224 is coupled to −C by means of a resistor 229. Control grid 228 is also coupled to the anode 230 of device 225 through the parallel combination of a resistor 231 and a condenser 232. The control grid 233 of device 225 is coupled to −C by means of a resistor 234, which resistor is shunted by a single-pole single-throw switch 235. Control grid 233 is also coupled to the anode 236 of device 224 by means of a parallel circuit comprising a resistor 237 and a condenser 238. Anode 230 is coupled to B+ through the series circuit comprising a pair of resistors 239 and 240. Anode 236 is coupled to resistor 240 through a resistor 241. Anode 221 of device 214 is coupled to the junction 242 between resistors 240 and 241 by means of a coupling condenser 243. Anode 236 of device 224 is connected to a first output terminal 244, and a second output terminal 245 is directly connected to ground.

That portion of the coding apparatus shown schematically in Figure 2A comprises a random square-wave generator for developing a fist control signal at the transmitter, in a manner to be described hereinafter in greater detail. To obtain coding of two different characteristics of the composite television signal during two different groups of spaced time intervals, two such random square-wave generators are required. Figure 2B represents schematically the second random square-wave generator 247, which is used to develop a second control signal. Field-frequency drive pulses of negative polarity are applied to input terminals 111 and 112 of random square-wave generator 247, and a second control signal is derived from output terminals 248 and 249. The construction and manner of operation of random square-wave generator 247 are identical with the construction and manner of operation of the first random square-wave generator represented schematically in Figure 2A; however, since the output of each random square-wave generator is dependent upon locally generated random noise signals, in a manner to be explained in detail hereinafter, the control signal derived from output terminals 248 and 249 of generator 247 differs from that derived from output terminals 244 and 245 of the circuit of Figure 2A.

Figure 2C:
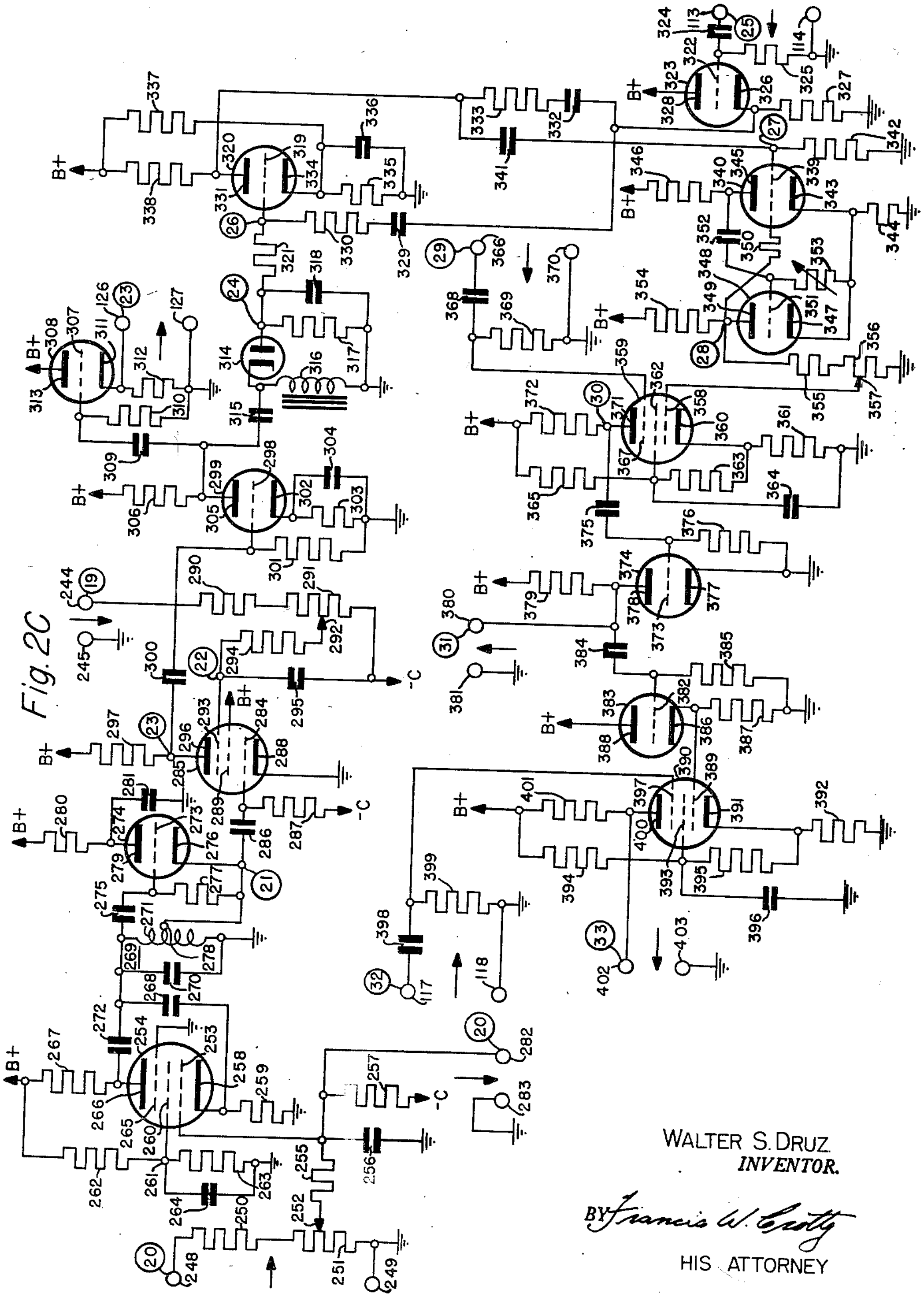

Referring now to Figure 2C, the output signal from the second random square-wave generator 247 of Figure 2B is applied across a voltage divider comprising a fixed resistor 250 and a potentiometer 251 arranged in series and grounded at one end. The variable tap 252 of potentiometer 251 is connected to the control grid 253 of an electron-discharge device 254 by means of an integrating circuit comprising a series resistor 255 and a shunt condenser 256. Control grid 253 is directly connected to a terminal 282, and another terminal 283 is connected to ground. Control grid 253 is also coupled to −C by means of a resistor 257. The cathode 258 of device 254 is coupled to ground by means of a resistor 259. The screen grid 260 of device 254 is connected to a point 261 intermediate a pair of resistors 262 and 263 which are connected in series between B+ and ground. A condenser 264 is connected in parallel with resistor 263. The suppressor grid 265 of device 254 is directly connected to ground, and the anode 266 of device 254 is coupled to B+ by means of a load resistor 267. A phase-shifting condenser 268 is connected between anode 266 and cathode 258.

Anode 266 of device 254 is coupled to an oscillatory circuit 269, comprising a condenser 270 and an inductor 271, by means of a condenser 272. One terminal of inductor 271 is connected to ground, and the other terminal is coupled to the control grid 273 of an electron-discharge device 274 by means of a condenser 275. Control grid 273 is returned to the cathode 276 of device 274 by means of a grid resistor 277, and cathode 276 is connected to a tap 278 on inductor 271. The anode 279 of device 274 is coupled to B+ through a resistor 280, and anode 279 is bypassed to ground for high frequencies by means of a condenser 281.

Cathode 276 is coupled to the control grid 284 of an electron-discharge device 285 by means of a coupling condenser 286. Control grid 284 is coupled to −C by means of a resistor 287. The cathode 288 of device 285 is directly connected to ground, and the screen grid 289 of device 285 is directly connected to B+. Terminal 244 of the first random square-wave generator of Figure 2A is coupled to −C, see Figure 2C, by means of a pair of series connected resistors 290 and 291, and a variable tap 292 associated with resistor 291 is coupled to the third grid 293 of electron-discharge device 285 by means of a resistor 294. Grid 293 is also coupled to −C by means of a condenser 295. Anode 296 of device 285 is coupled to B+ by means of a load resistor 297.

Anode 296 is coupled to the control grid 298 of an electron-discharge device 299 by means of a coupling condenser 300, and control grid 298 is returned to ground by means of a grid resistor 301. The cathode 302 of device 299 is coupled to ground by means of a resistor 303, and a condenser 304 is connected in shunt with resistor 303. Anode 305 of device 299 is coupled to B+ by means of a load resistor 306.

Anode 305 is coupled to the control grid 307 of an electron-discharge device 308 by means of a coupling condenser 309. Control grid 307 is returned to ground through a grid resistor 310. The cathode 311 of device 308 is coupled to ground through a cathode resistor 312, and key-signal output terminals 126 and 127 are connected to the respective terminals of resistor 312. The anode 313 of device 308 is directly connected to B+.

Anode 305 of device 299 is also coupled to the cathode of a rectifier device 314 by means of a coupling condenser 315. An inductor 316 is connected from the cathode of rectifier 314 to ground. The anode of rectifier 314 is connected to ground by means of a resistor 317, and a condenser 318 is connected in parallel with resistor 317. The anode of rectifier 314 is also coupled to the control grid 319 of an electron-discharge device 320 by means of a resistor 321.

Field-frequency drive pulses of positive polarity appearing between terminals 113 and 114 of decoding apparatus 110 (Figure 1) are applied to the control grid 322 of an electron-discharge device 323 by means of a coupling condenser 324 and a grid resistor 325. The cathode 326 of device 323 is coupled to ground through a cathode resistor 327, and the anode 328 of device 323 is directly connected to B+. Cathode 326 is coupled to control grid 319 of electron-discharge device 320 by means of a coupling condenser 329 and a resistor 330. Cathode 326 of device 323 is also coupled to the anode 331 of electron-discharge device 320 by means of a coupling condenser 332 and a resistor 333.

The cathode 334 of device 320 is coupled to ground through a resistor 335, and a condenser 336 is connected in shunt with resistor 335. Cathode 334 is also connected to B+ through a voltage dropping resistor 337. Anode 331 of device 320 is coupled to B+ through a load resistor 338.

Anode 331 of device 320 is coupled to the control grid 339 of an electron-discharge device 340 by means of a coupling condenser 341. Control grid 339 is returned to ground through a grid resistor 342. The cathode 343 of device 340 is coupled to ground through a cathode resistor 344, and the anode 345 of device 340 is coupled to B+ by means of a load resistor 346.

Cathode 343 of device 340 is directly connected to the cathode 347 of an electron-discharge device 348, and control grid 339 of device 340 is coupled to the anode 349 of device 348 by means of a resistor 350. The control grid 351 of device 348 is coupled to anode 345 of device 340 by means of a condenser 352, and control grid 351 is returned to cathode 347 by means of a variable resistor 353. Anode 349 of device 348 is coupled to B+ through a load resistor 354.

Anode 349 of device 348 is coupled to ground through the series combination of a fixed resistor 355 and a potentiometer 356. The variable tap 357 associated with potentiometer 356 is connected to the control grid 358 of an electron-discharge device 359. The cathode 360 of device 359 is coupled to ground by means of a resistor 361, and to the screen grid 362 of device 359 by means of a resistor 363. Screen grid 362 is bypassed to ground by means of a condenser 364, and is coupled to B+ by means of a resistor 365.

An input terminal 366, from a portion of the circuit yet to be described, is coupled to the third grid 367 of device 359 by means of a condenser 368, and grid 367 is returned to ground through a grid resistor 369. The other input terminal 370 is directly connected to ground. The anode 371 of device 359 is coupled to B+ through a load resistor 372.

Anode 371 is coupled to the control grid 373 of an electron-discharge device 374 by means of a coupling condenser 375, and control grid 373 is returned to ground through a grid resistor 376. The cathode 377 of device 374 is directly connected to ground. The anode 378 of device 374 is coupled to B+ through a load resistor 379, and an output terminal 380 is coupled to anode 378. The other output terminal 381 is connected to ground.

Anode 378 is coupled to the control grid 382 of an electron-discharge device 383 by means of a coupling condenser 384. Control grid 382 is returned to ground through a grid resistor 385. The cathode 386 of device 383 is connected to ground through a load resistor 387, and the anode 388 of device 383 is directly connected to B+.

Cathode 386 of device 383 is directly connected to the control grid 389 of an electron-discharge device 390. The cathode 391 of device 390 is coupled to ground through a resistor 392. The screen grid 393 of device 390 is coupled to B+ by means of a resistor 394, and another resistor 395 is coupled between screen grid 393 and cathode 391. Screen grid 393 is also bypassed to ground by means of a condenser 396. Terminal 117 of coding apparatus 110 (Figure 1) is coupled to the third grid 397 of device 390 by means of a coupling condenser 398. Grid 397 is returned to ground by means of a grid resistor 399, and terminal 118 is directly connected to ground. The anode 400 of device 390 is coupled to B+ through a load resistor 401. An output terminal 402 is directly connected to anode 400, and a second output terminal 403 is grounded.

Figure 2D:
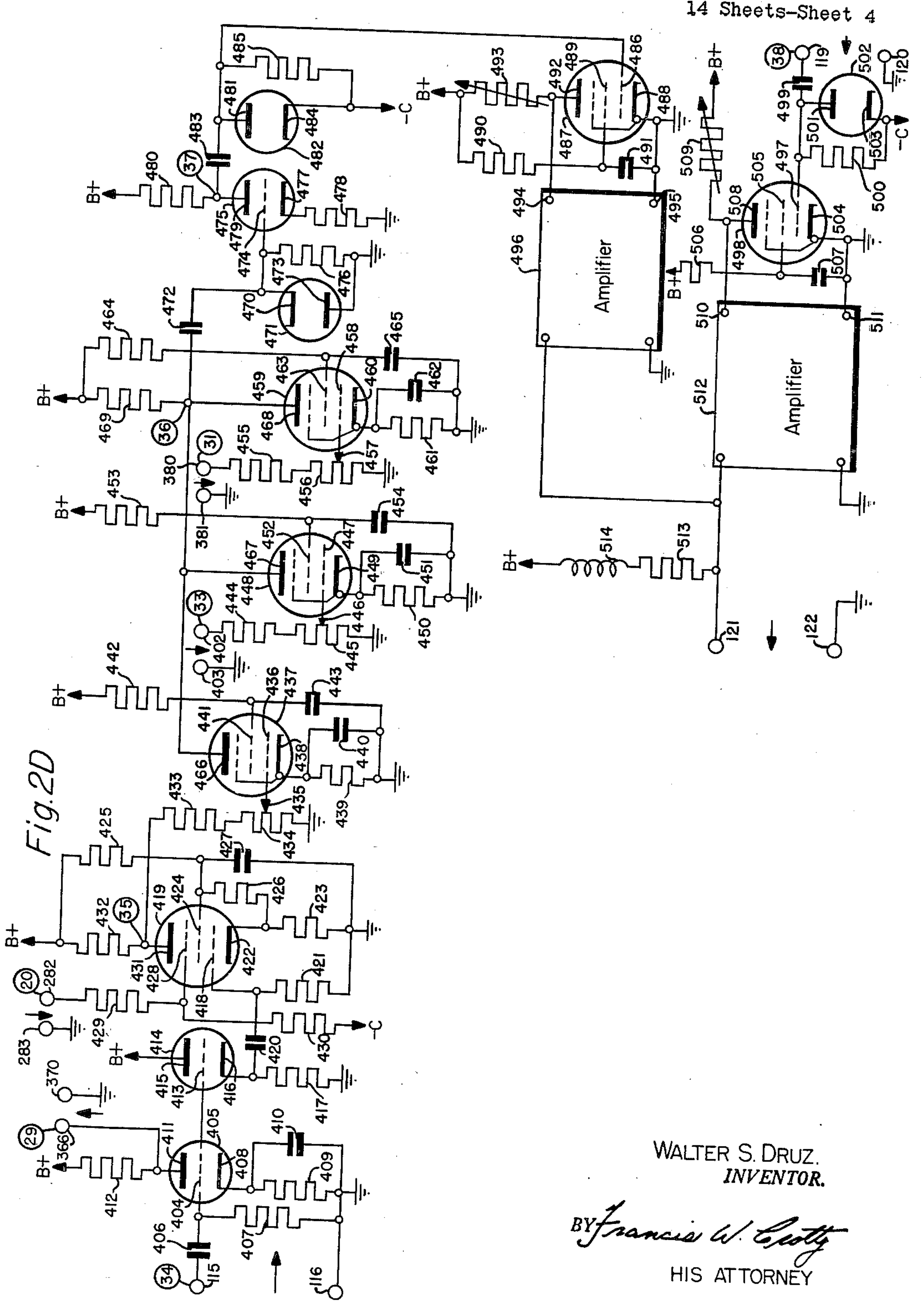

Referring now to Figure 2D, terminal 115 of coding apparatus 110 (Figure 1) is coupled to the control grid 404 of an electron-discharge device 405 by means of a coupling condenser 406, and control grid 404 is returned to ground through a grid resistor 407. Terminal 116 is directly connected to ground. The cathode 408 of device 405 is coupled to ground through a resistor 409, and a condenser 410 is connected in parallel with resistor 409. The anode 411 of device 405 is coupled to B+ through a load resistor 412. Anode 411 is connected to terminal 366 of Figure 2C.

Control grid 404 of device 405 is connected to the control grid 413 of an electron-discharge device 414. The anode 415 of device 414 is connected to B+, and the cathode 416 of device 414 is coupled to ground through a load resistor 417.

Cathode 416 of device 414 is coupled to the control grid 418 of an electron-discharge device 419 by means of a condenser 420. Control grid 418 is returned to ground through a grid resistor 421. The cathode 422 of device 419 is coupled to ground through a resistor 423. The screen grid 424 of device 419 is coupled to B+ through a resistor 425, and to cathode 422 by means of a resistor 426. Screen grid 424 is bypassed to ground by means of a condenser 427. Terminal 282 of the portion of the circuit shown in Figure 2C is coupled to the third grid 428 of device 419 by means of a resistor 429, and third grid 428 is coupled to −C by means of a resistor 430. The anode 431 of device 419 is coupled to B+ through a load resistor 432.

Anode 431 is coupled to ground through the series combination of a fixed resistor 433 and a potentiometer 434. The variable tap 435 associated with potentiometer 434 is connected to the control grid 436 of an electron-discharge device 437. The cathode 438 of device 437 is connected to ground through a resistor 439, and a condenser 440 is connected in shunt with resistor 439. Screen grid 441 of device 437 is coupled to B+ through a resistor 442, and screen grid 441 is bypassed to ground by means of a condenser 443. The suppressor grid of device 437 is connected to the cathode.

Terminal 402 from Figure 2C is connected to ground through the series combination of a fixed resistor 444 and a potentiometer 445, see Figure 2D. The variable tap 446 associated with potentiometer 445 is connected to the control grid 447 of an electron-discharge device 448. The cathode 449 of device 448 is connected to ground through a resistor 450, and a condenser 451 is connected in shunt with resistor 450. The screen grid 452 of device 448 is coupled to B+ through a resistor 453, and screen grid 452 is bypassed to ground by means of a condenser 454. The suppressor grid of device 448 is connected to cathode 449.

Terminal 380 from Figure 2C is connected to ground through the series combination of a fixed resistor 455 and a potentiometer 456. The variable tap 457 associated with potentiometer 456 is connected to the control grid 458 of an electron-discharge device 459. The cathode 460 of device 459 is connected to ground through a resistor 461, and a condenser 462 is connected in parallel with resistor 461. The screen grid 463 of device 459 is coupled to B+ through a resistor 464, and screen grid 463 is bypassed to ground by means of a condenser 465. The suppressor grid of device 459 is connected to cathode 460.

The anodes 466, 467, and 468 of devices 437, 448, and 459, respectively, are connected together and to B+ through a common load resistor 469. The common connection between anodes 466, 467, and 468 is coupled to the cathode 470 of a diode rectifier 471 by means of condenser 472. The anode 473 of diode 471 is grounded.

Cathode 470 of diode 471 is connected to the control grid 474 of an electron-discharge device 475. Control grid 474 is connected to ground through a grid resistor 476. The cathode 477 of device 475 is coupled to ground through a resistor 478. The anode 479 of device 475 is coupled to B+ through a load resistor 480.

Anode 479 of device 475 is coupled to the anode 481 of a diode rectifier device 482 by means of a condenser 483. The cathode 484 of diode 482 is connected to −C, and a resistor 485 is connected in parallel with diode 482.

Anode 481 of diode 482 is connected to the control grid 486 of an electron-discharge device 487. The cathode 488 of device 487 is grounded, and the screen grid 489 of device 487 is connected to B+ through a resistor 490. Screen grid 489 is bypassed to ground by means of a condenser 491. The suppressor grid of device 487 is connected to cathode 488, and the anode 492 is connected to B+ through a variable load resistor 493.

Anode 492 and cathode 488 of device 487 are coupled respectively to the input terminals 494 and 495 of an amplifier device 496, which may comprise any desired number of stages.

Terminal 119 of coding apparatus 110 (Figure 1) is coupled to the control grid 497 of an electron-discharge device 498 by means of a condenser 499. Control grid 497 is connected to −C through a resistor 500. Control grid 497 is also connected to the anode 501 of a diode rectifier device 502, the cathode 503 of which is connected to −C. The cathode 504 of device 498 is grounded, and the screen grid 505 is coupled to B+ through a resistor 506. Screen grid 505 is bypassed to ground by means of a condenser 507. The suppressor grid of device 498 is connected to cathode 504, and the anode 508 of device 498 is connected to B+ through a variable load resistor 509.

Anode 508 and cathode 504 of device 498 are coupled respectively to the input terminals 510 and 511 of an amplifier 512. Amplifier 512 comprises the same number of stages, or the same number plus or minus an integral multiple of 2, as amplifier 496.

The final stages of amplifiers 496 and 512 are connected through a common load impedance, which comprises a load resistor 513 arranged in series with a peaking coil 514, to B+. Output terminals 121 and 122, connected to the common load impedance and to ground respectively, are direct-coupled to the modulator 123 (Figure 1).

The operation of the coding apparatus represented schematically by Figures 2A, 2B, 2C, and 2D may best be understood by a consideration of those figures in conjunction with the idealized graphical waveform representations of Figures 3A, 3B, 3C, 3D, and 3E.

Figure 3A:
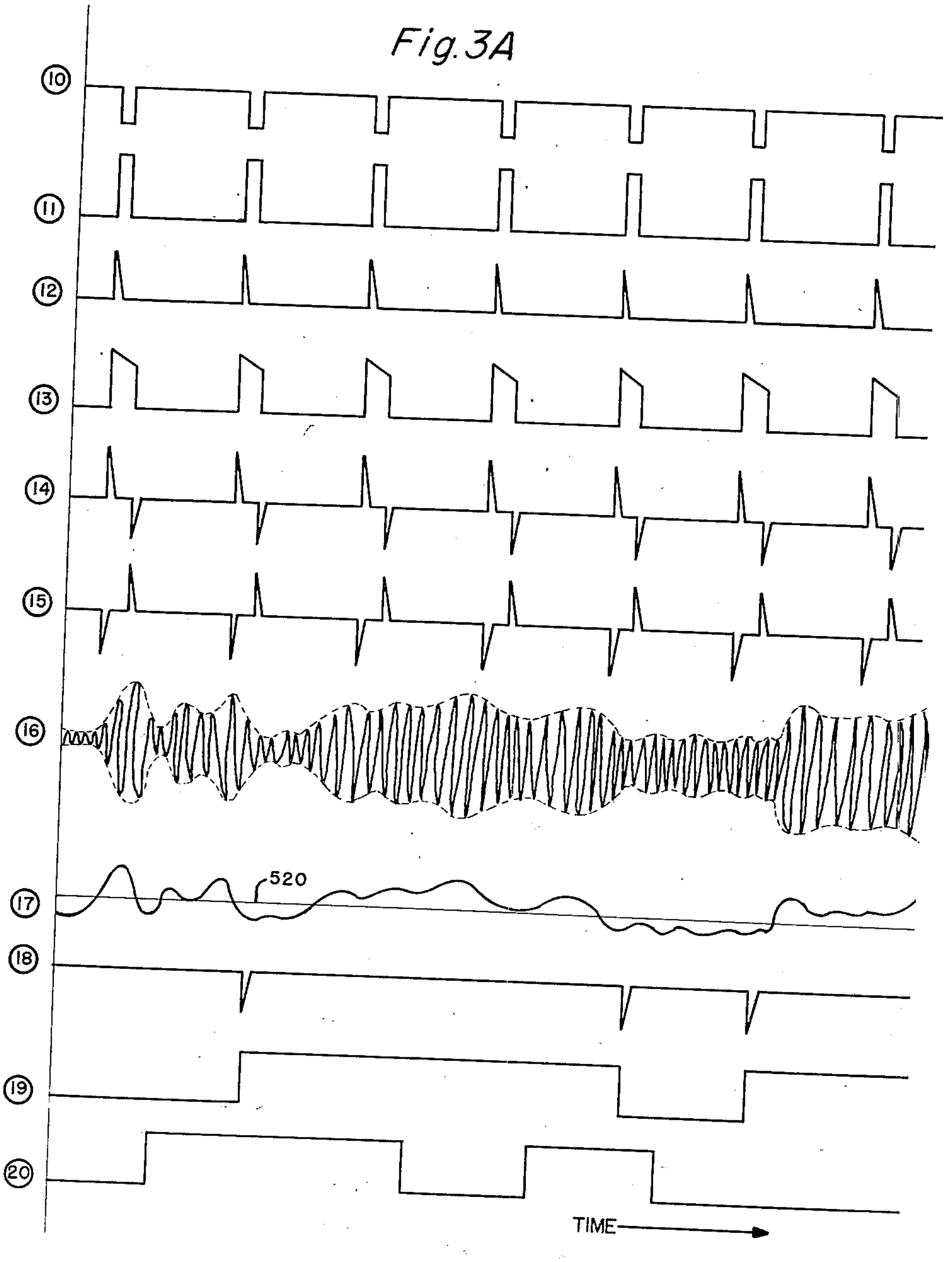

With particular reference to Figures 2A and 3A, field-frequency drive pulses 10 of negative polarity are applied to the input circuit of electron-discharge device 132, which functions as an amplifier-inverter. Thus, positive polarity field-frequency drive pulses of increased amplitude, represented by waveform 11, appear across output load impedance 136. Condenser 138 and resistor 141 function as a differentiating circuit, and to that end are arranged to have a time constant which is short relative to the field-scanning frequency. Rectifier device 137 operates to shunt the differentiated pulses of negative polarity to ground, so that only positive-polarity differentiated pulses, as represented by waveform 12, are applied to control grid 139 of device 140.

Devices 140 and 147 and their associated circuit elements comprise a multivibrator, and the output pulse repetition rate is adjustable by means of variable resistor 151. The output pulses appearing across load resistor 153 are of positive polarity and are represented by waveform 13, and the width of these pulses is adjusted to a predetermined value such that the trailing edge of each pulse occurs near the end of a field-frequency pedestal period.

Condenser 156 and resistor 158 are arranged to have a time constant which is short relative to the field-scanning frequency, for the purpose of differentiating the output pulses appearing across resistor 153. These differentiated pulses are represented by waveform 14 and are applied to the input circuit of device 155, which functions as an inverter. The pulses which appear across output load resistor 160 are represented by waveform 15.

Electron-discharge device 161 functions as a noise-generator in a manner well known in the art, and the output developed across resistor 164 represents random noise bursts due to the shot effect, which may be represented by waveform 16. Device 166 and its associated circuit elements functions as an amplifier for the noise signal generated by device 161, and condenser 173 operates to bypass the high-frequency components of the noise signal. Device 175 also functions as an amplifier, and the signal appearing across output resistor 182, represented by waveform 17, corresponds to the amplified envelope of the noise signal 16 developed by device 161. The amplitude of signal 17 may be adjusted by means of variable tap 178 associated with potentiometer resistor 177.

Device 184 serves to apply amplified random noise signal 17 to the cathode 191 of device 192, which is arranged as a blocking oscillator. At the same time, the differentiated and inverted pulses 15 from device 155 are applied to the control grid circuit of device 192. As in conventional blocking oscillator circuits, each positive pulse applied to the grid through the blocking transformer primary 197 tends to fire the blocking oscillator. However, the noise signal 17 applied to the cathode of the blocking oscillator also exerts a control, permitting the blocking oscillator to fire only when the noise signal applied to cathode 191 is below a predetermined value represented for example by the line 520 in waveform 17. Consequently, blocking oscillator 192 fires only in response to a coincidence of a positive-polarity pulse from anode 159 of device 155 and an instantaneous noise signal applied to cathode 191 which is of lesser amplitude than that represented by line 520 of waveform 17. The voltage applied to the control grid 206 of device 207 is therefore represented by waveform 18 and comprises a plurality of negative-polarity pulses in time alignment with the trailing edges of corresponding multivibrator output pulses 13, but corresponding only to randomly selected multivibrator output pulses.

Device 207 and its associated circuit elements function as an amplifier, as do device 214 and its associated circuit components. The negative-polarity output pulses developed across resistor 222 are applied to the Eccles-Jordan trigger circuit, comprising devices 224 and 225, the output of which is represented by waveform 19. The manner of operation of the Eccles-Jordan circuit is well known in the art, and a detailed explanation of this operation is not deemed necessary for an understanding of the present invention.

The signal appearing between terminals 244 and 245, represented by waveform 19, is a first control signal which is utilized to determine the coding intervals for one of the characteristics of the composite television signal. In the illustrated embodiment, this first control signal determines the times of occurrences of the time intervals during which the line-frequency synchronizing-signal components and the video-frequency components are coded. For illustrative purposes only, the exemplary arrangement shown in the drawings utilizes the intervals of maximum positive amplitude of the first control signal as the coding intervals.

In the illustrated embodiment, two characteristics of the composite television signal are coded during overlapping groups of spaced time intervals. Therefore, two control signals are needed. Figure 2B represents schematically the second random square-wave generator utilized to generate the second control signal. The constructional and operational details of random square-wave generator 247 of Figure 2B may be identical with those of the first random square-wave generator shown in detail in Figure 2A; however, since each generator is responsive to an independent random noise generator to determine the actuation of an Eccles-Jordan trigger circuit, the random square-wave output from generator 247 of Figure 2B differs from that appearing between terminals 244 and 245 of the first random square-wave generator of Figure 2A. For illustrative purposes, it is assumed that the output appearing between terminals 248 and 249 of the second random square-wave generator 247 of Figure 2B may be represented by waveform 20.

Figure 3B:
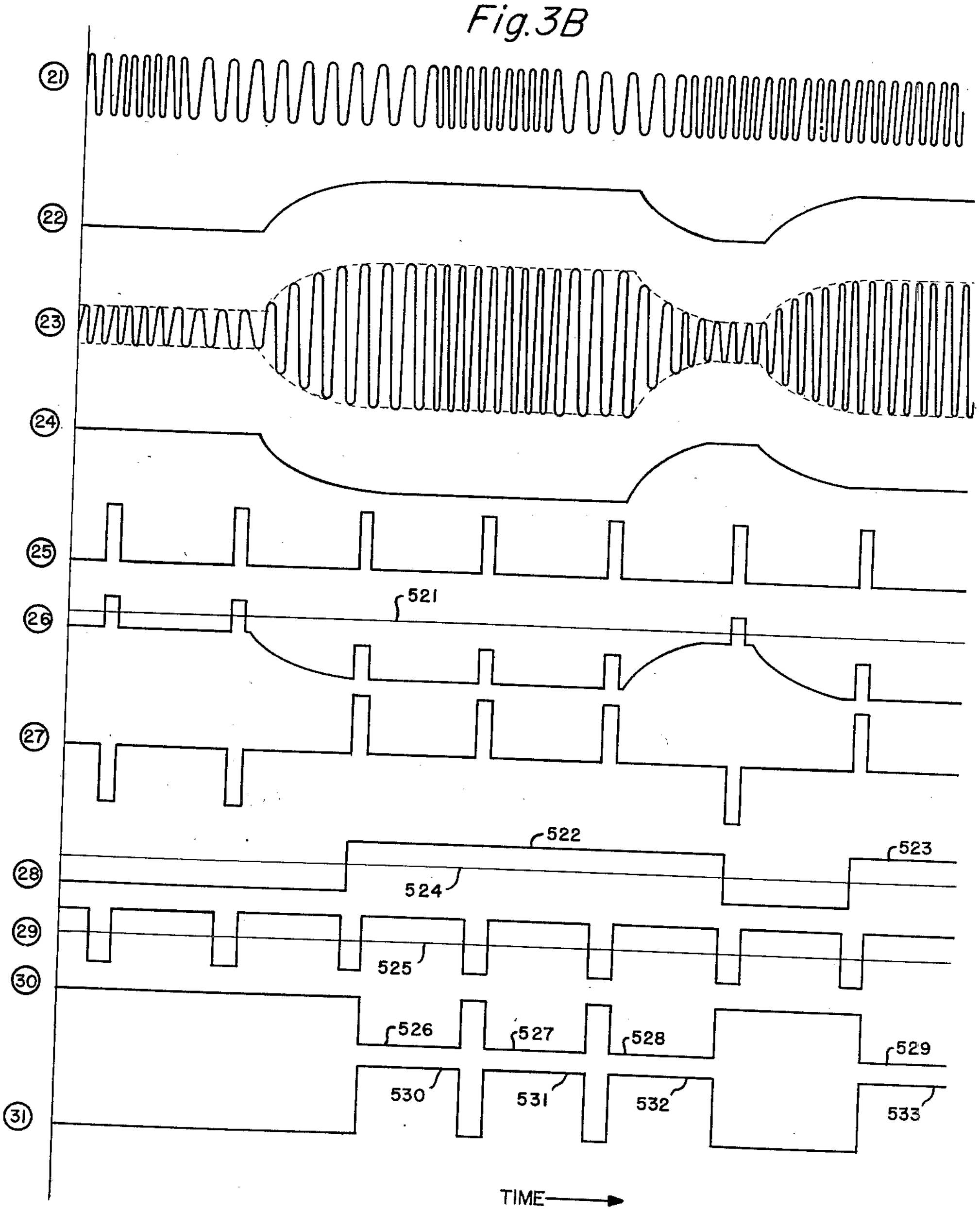

With reference now to waveforms of Figure 3B and to the circuit of Figure 2C, electron-discharge device 274 is arranged in connection with oscillatory circuit 269 to produce sinusoidal oscillations of substantially constant amplitude. The second control signal, represented by wave-form 20 of Figure 3A, is applied from the second random square-wave generator 247 of Figure 2B to the control grid 253 of device 254. Device 254 and its associated circuit components are arranged in operative connection with the sine-wave oscillator including device 274 to function as a reactance modulator. The operation of the reactance modulator is well known in the art and is therefore not here described in detail. In brief, however, the frequency of the sine-wave signal generated by device 274 and oscillatory circuit 269 is dependent upon the amount of space current drawn by device 254, a decrease in the amount of space current drawn by device 254 resulting in an increase in the operating frequency of the sine-wave oscillator. Thus, the signal appearing at the cathode 276 of device 274 is a frequency-modulated sine-wave signal having a waveform substantially as shown at 21 in Figure 3B.

At the same time, the first control signal, represented by waveform 19 of Figure 3A, is applied from the circuit of Figure 2A to terminals 244 and 245 of Figure 2C. This first control signal is passed through an integrating circuit to one of the grids 293 of electron-discharge device 285, the integrated control signal being represented as waveform 22 in Figure 3B. The frequency-modulated sine-wave signal from cathode 276, represented by waveform 21, is applied to another grid 284 of device 285. Device 285 and its associated circuit elements functions as an amplifier and as an amplitude modulator, in a manner well known in the art, so that the output appearing across resistor 297 is represented by waveform 23 of Figure 3B. After amplification by device 299, signal 23 is impressed upon the input circuit of device 308, which serves as an isolating device, the output of which is supplied to central station 129 over leads 128 (Figure 1).

Thus, signal 23 is the key signal which is furnished to authorized subscribers upon request and for which a charge is made to assist in defraying the expense of producing the telecast. To recapitulate, key signal 23 is amplitude-modulated to indicate the times of occurrence of the coding intervals during which the line-frequency synchronizing-signal components and the video-frequency components are coded, and is frequency-modulated to indicate the times of occurrences of the coding intervals during which the field-frequency synchronizing-signal components are coded. At the transmitter, the same key signal 23 is utilized to control the remaining portion of the coding apparatus which operates to produce a coding signal during the now predetermined coding intervals.

The key signal 23 is applied from load resistor 306 of amplifier 299 to a rectifier device 314 which operates as an amplitude detector to produce a signal, represented by waveform 24, which corresponds to the envelope of the key signal 23. At the same time, field-frequency drive pulses of positive polarity, represented by waveform 25, are applied to the input circuit of device 323 and are translated to load impedance 327, device 323 functioning to isolate the remainder of the coding apparatus from the synchronizing-signal and sweep-signal generators 103 (Figure 1). The field-frequency drive pulses 25 are applied across a voltage divider comprising resistors 330, 321, and 317, and are thus effectively superposed on the key-signal envelope to form a composite input signal, represented by waveform 26, which is applied to the control grid 319 of device 320.

Electron-discharge device 320 and its associated circuit elements are arranged to function as a gate, allowing only selected input pulses to be translated to the output circuit. To this end, cathode 334 is positively biased by connection to B+ through resistor 337, which is equivalent to a negative bias on control grid 319. The amount of bias voltage applied in this manner is so chosen that the space current of device 320 is cut off at all times except in the presence of an input signal at control grid 319 which is greater than the value represented for example by line 521 of waveform 26. Negative-polarity output pulses appear across resistor 338 each time the input signal 26 exceeds the value represented by line 521. During the coding intervals, the rectified key signal prevents control grid 319 from rising above the cut-off voltage 521, and no output pulses are developed during these intervals. However, positive-polarity field-frequency drive pulses are applied across resistor 338 by means of condenser 332 and resistor 333. Resistors 330, 321, 317, 333, and 338 are so proportioned that the amplitude of the negative-polarity pulses appearing across resistor 338 during intervals when the composite television signal is unaltered is exactly equal to twice the amplitude of the positive-polarity field-frequency drive pulses applied across resistor 338 by means of condenser 332 and resistor 333. Thus, the output voltage developed at anode 331 of device 320, represented by waveform 27, comprises alternate series of positive and negative pulses of equal amplitude and individually of time duration equal to that of each field-frequency drive pulse.

Electron-discharge devices 340 and 348 and their associated circuit components are arranged as a pulse generator of the multivibrator type which responds to signal 27 to produce an output signal, represented by waveform 28, comprising pulses 522 and 523 of positive polarity. Device 340 is normally non-conducting and is rendered conductive by the first one of each series of positive-polarity pulses from anode 331 of device 320. Similarly, the first one of each series of negative-polarity pulses from anode 331 of device 320 renders device 340 once again non-conducting and causes device 348 to conduct thereby reducing the potential of anode 349.

The output signal 28 appearing across resistor 354 is adjusted in amplitude by means of variable tap 357 on potentiometer 356 and is applied to the first grid 358 of a background gating device 359. At the same time, field-frequency pedestal pulses of negative polarity, represented by waveform 29, are applied to the third grid 367 of device 359 from the synchronizing-signal and sweep-signal generators 103 (Figure 1). The first grid 358 is biased to cut off at a voltage intermediate the maximum positive and negative values of signal 28, this cut-off potential being represented for example in waveform 28 by means of line 524. Similarly, the third grid 367 is biased to cut off at a voltage intermediate the maximum positive and negative values of the field-frequency pedestal pulses 29, this cut-off value being represented for example by line 525 of waveform 29. In this manner, device 359 is caused to pass space current to the anode 371 only during those intervals when both grids 358 and 367 are more positive than the cut-off potentials 524 and 525.

The output signal developed across load resistor 372, represented by waveform 30, comprises a series of negative-polarity pulses 526, 527, 528 and 529 which are in time coincidence with respective field-scanning intervals of picture-converting device 102 (Figure 1). This signal is applied to device 374, which operates as an amplifier and inverter, and the resulting signal, represented by waveform 31, comprises a series of positive-polarity pulses 530, 531, 532 and 533 and is termed for convenience a first coding signal. This first coding signal is translated to terminals 380 and 381.

Figure 3C:
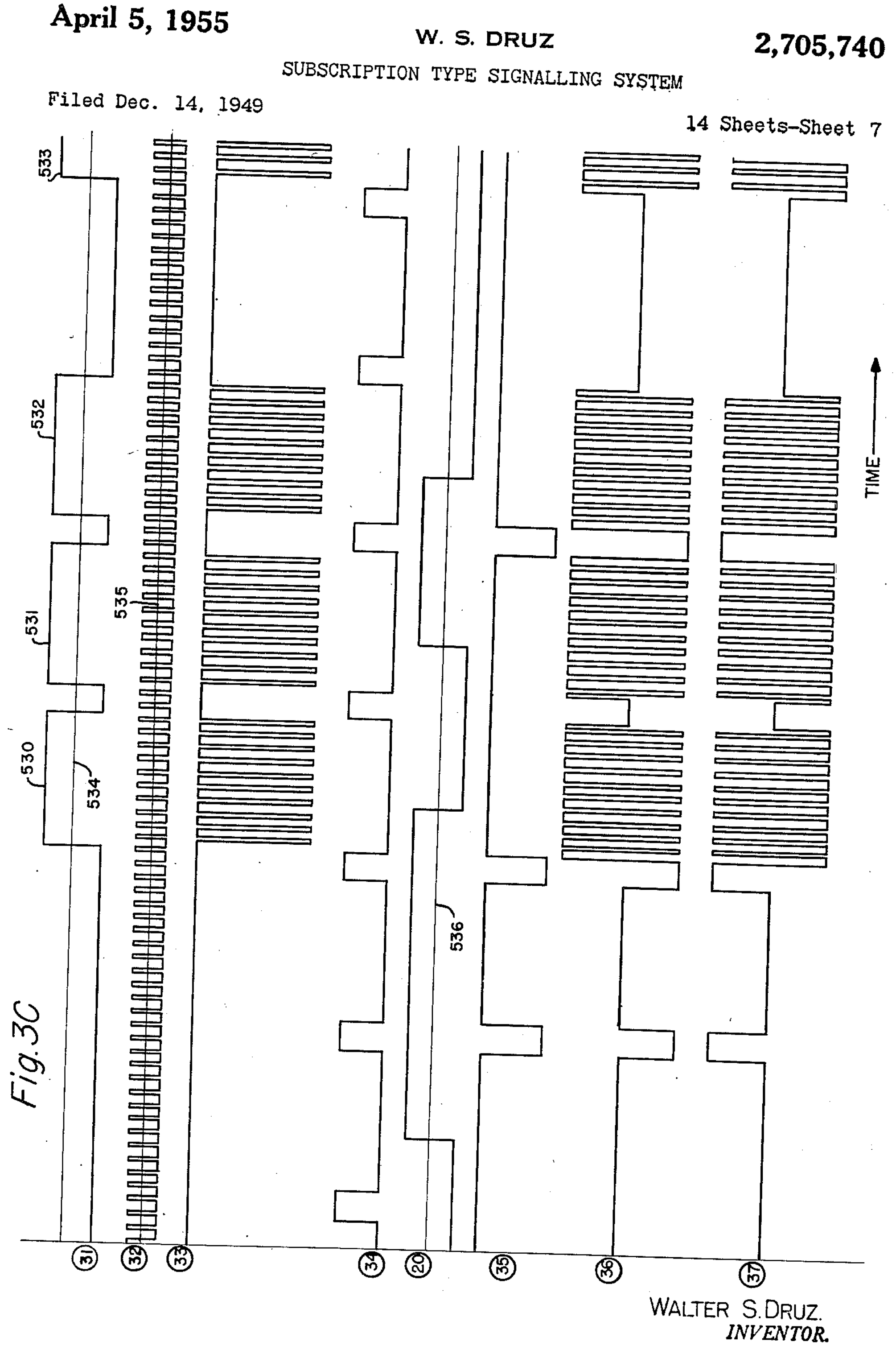

In Figure 3C, illustrating several field periods, waveform 31 is reproduced to a larger scale for convenience in explaining the further operation of the invention. The first coding signal 31 is applied to the first grid 389 of device 390 by way of device 383, which serves to isolate the input circuit of device 390 from terminals 380 and 381. At the same time, positive-polarity line-frequency blanking pulses, represented by waveform 32, are applied to the third grid 397 of device 390 by way of terminals 117 and 118. While it is present practice to include 262½ line-scanning intervals in each field-scanning interval, a reduced number of line-frequency blanking pulses has been shown to avoid crowding the drawing; furthermore, for the same purpose, the time duration of the individual line intervals has been reduced.

Device 390 and its associated circuit elements are constructed and arranged to operate as an electronic gate. To this end, the first grid 389 of device 390 is biased, by proper selection of resistors 392, 394, and 395, to cut off at a voltage intermediate the maximum positive and negative values of first coding signal 31, represented for example by line 534 in Figure 3C. At the same time, third grid 397 of device 390 is biased to cut off at a voltage intermediate the maximum positive and negative values of line-frequency blanking pulses 32, indicated for example by line 535 in the drawing. As a consequence, space current flows to anode 400 only during those intervals when both first coding signal 31 and line-frequency blanking pulses 32 are at their respective maximum positive values, and the output signal appearing between terminals 402 and 403, which may be termed a second coding signal, comprises a series of negative-polarity pulses, individually of time duration equal to that of each individual line-frequency blanking pulse, as shown in waveform 33.

With reference now to Figures 2D and 3C, field-frequency pedestal pulses of positive polarity, represented by waveform 34, are applied to the input circuit of device 405 by way of terminals 115 and 116. These positive-polarity field-frequency pedestal pulses are amplified and inverted by device 405, and the pulses developed across load resistor 412 are translated to terminals 366 and 370 for application to the input circuit of device 359 of Figure 2C.

Positive-polarity field-frequency pedestal pulses 34 are also applied to the input circuit of device 414, and are translated without change in polarity to the first grid 418 of device 419. At the same time, the second control signal from second random square-wave generator 247 of Figure 2B, represented by waveform 20, is applied to the third grid 428 of device 419. Third grid 428 is biased to cut off at a value intermediate the maximum positive and negative values of signal 20, represented for example by line 536 in Figure 3C, so that the field-frequency pedestal pulses 34 are translated to load resistor 432 only during those intervals when the second control signal 20 is at its maximum positive value. The output developed across load resistor 432 comprises randomly selected negative-polarity field-frequency pedestal pulses, as shown in waveform 35. Signal 35 is used to suppress randomly selected field-frequency pedestal pulses of the composite video signal, and may therefore be termed a third coding signal.

Devices 437, 448, and 459, and their associated circuit elements, are arranged to function as a mixer. First coding signal 31 is applied to the input circuit of device 459, second coding signal 33 is applied to the input circuit of device 448, and third coding signal 35 is applied to the input circuit of device 437. The relative amplitudes of the coding signals are adjusted by means of variable taps 435, 446, and 457 associated with potentiometers 434, 445, and 456, respectively. Anodes 466, 467, and 468 of devices 437, 448, and 459 respectively are connected to B+ through a common load resistor 469, and the output voltage, represented by waveform 36, corresponds to the algebraic sum of the individual coding signals 31, 33 and 35. Signal 36 is amplified and inverted by device 475, and the amplified and inverted signal 37, a composite coding signal, is amplified by devices 487 and 496; diode 482 provides peak stabilization of the composite coding signal.

At the same time, the normal composite television signal appearing at terminals 119 and 120 is amplified by devices 498 and 512 after peak stabilization by diode 502. Amplifiers 496 and 512 work into a common load impedance, so that the composite coding signal 37 is effectively superimposed upon the normal composite television signal. Thus, a coded composite television signal is provided between terminals 121 and 122.

Figure 3D:
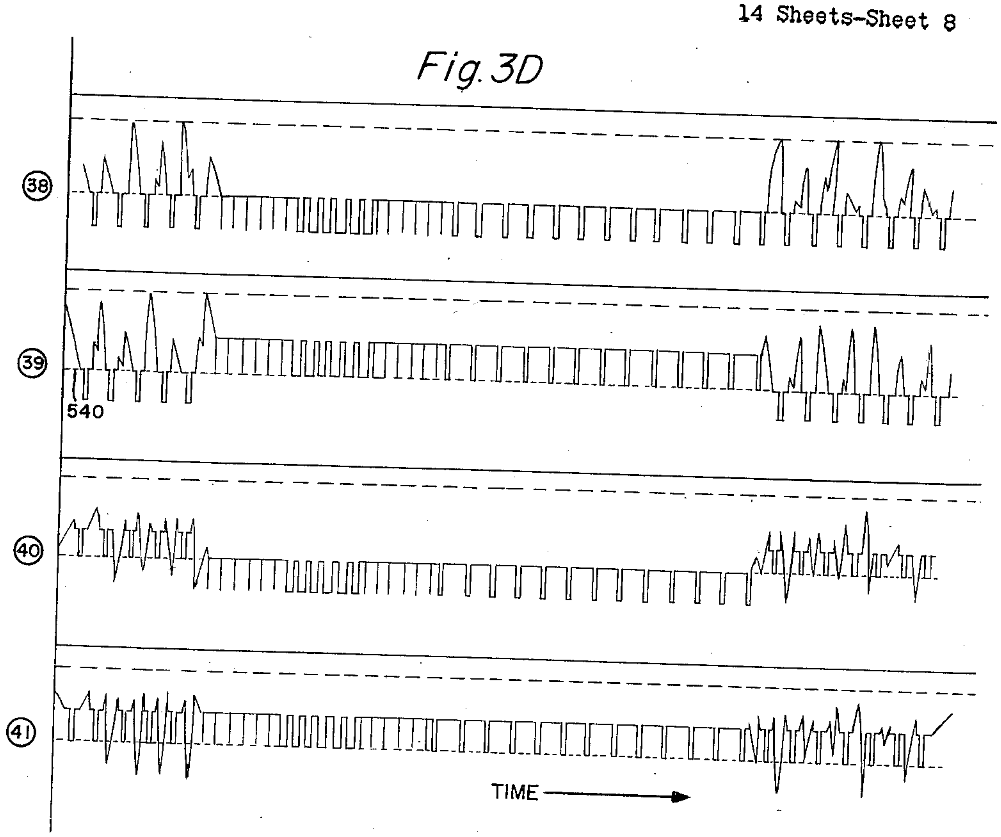

With reference now to Figure 3D, waveform 38 represents a negative-polarity composite television signal before coding, for an interval including one field-frequency pedestal period. Waveform 39 represents a portion of a composite television signal which has been coded in accordance with the present invention by suppressing the field-frequency synchronizing-signal components. The dotted line 540 represents "black" level, and the field-frequency synchronizing-signal components have been suppressed to such an extent that no portion of the field-frequency synchronizing-signal components extends into the "blacker than black" region. Consequently, reception of signal 39 by an unauthorized receiver is unsatisfactory due to loss of field-frequency synchronization.

Waveform 40 represents a composite television signal which has been coded by suppressing the line-frequency synchronizing-signal components and simultaneously shifting the amplitude range of the video-frequency components in the opposite direction. A coded signal of this type is characterized by loss of line-frequency synchronization and by "tearing out" due to false synchronization on video-frequency components extending into the "blacker than black" region.

Waveform 41 represents a composite television signal which has been completely coded in accordance with the present invention by suppressing both line-frequency and field-frequency synchronizing-signal components to "black" level or below and by simultaneously shifting the amplitude range of the video-frequency components in the opposite direction. With a signal of this type, the only information available to the synchronizing circuits of an unauthorized receiver is the false synchronizing information resulting from video-frequency components which have been transposed to the "blacker than black" region. An unauthorized receiver, in attempting to reproduce an image from a signal of the type shown in waveform 41, is characterized by complete loss of line-frequency and field-frequency synchronization, together with a random background variation, and the picture becomes utterly confused.

Figure 3E:
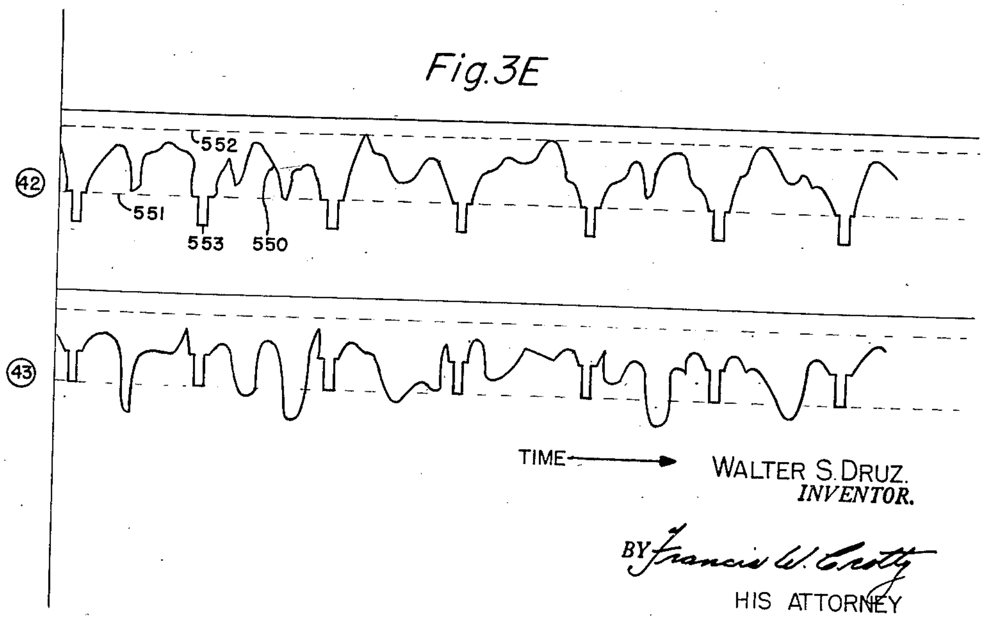

In Figure 3E, waveform 42 represents several line-scanning intervals of a normal uncoded composite television signal, the time scale having been expanded relative to that of the several waveforms of Figure 3D. The signal represented by waveform 42 comprises video-frequency components 550 having a predetermined amplitude range between "black" level 551 and "white" level 552, and line-frequency synchronizing-signal components 553 have a peak amplitude greater than the maximum amplitude within the amplitude range of the video-frequency components. The effect of superimposing the first and second coding signals on a normal composite television signal 42 is clearly shown by waveform 43, in which the line-frequency synchronizing-signal components have been suppressed below "black" level 551, and the amplitude-range of the video-frequency components has been shifted in the opposite direction so that some of the video-frequeniy components extend into the "blacker than black" region.

In accordance with the preferred embodiment of the invention, the line-frequency synchronizing-signal components and the video-frequency components are coded during one group of spaced time intervals determined by the first control signal 19, and the field-frequency synchronized-signal components are coded during a second group of spaced time intervals determined by the second control signal 20. The second group of spaced time intervals may overlap the first group, so that over several field-scanning intervals, the transmitted coded composite television signal comprises portions which are coded in each of the modes represented by the several waveforms of Figure 3D, thereby making intelligible reception without subscribing to the key signal virtually impossible. With the disclosed apparatus, the sequence in which the several modes represented by the waveforms of Figure 3D occur in the composite television signal is entirely random, being determined by the composite coding signal 37 of Figure 3C which in turn varies randomly in response to the random square-wave generators of Figures 2A and 2B.

In the event that it is desired to code the composite television signal in accordance with a predetermined regularly repetitive code pattern, switch 187 (Figure 2A) is closed to short-circuit the random noise signal to ground. Blocking oscillator 192 is then fired by positive pulses from device 155 at a repetition rate determined by the time constant of condenser 198 and whichever one of resistors 203, 204, and 205 is connected to grid 196 by way of switch arm 199. Resistors 203, 204, and 205 are of different values so that different regular code patterns may be selected at will.

As further variations, the coding of the video-signal components and line-frequency synchronizing-signal components may be effected randomly while the field-frequency synchronizing-signal components are coded at regular intervals, or vice versa. And, by omitting one of the random-square-wave generators of Figures 2A and 2B, the field-frequency synchronizing-signal components, or the video signal components and the line-frequency synchronizing-signal components, may be transmitted unaltered while still maintaining secrecy.

It is preferred that the field-frequency synchronizing-signal components be transmitted unaltered during at least a part of the first group of intervals, in which the line-frequency synchronizing-signal components and the video-frequency components are coded, in order that adequate information may be present for operation of a gated automatic gain control system at the receiver, to be hereinafter described. The use of separate and independent random square wave generators to provide the control signals for determining the intervals during which the line-frequency and field-frequency components are coded assures such operation.

Figure 4 is a schematic block diagram of a television receiver constructed and arranged to reproduce an intelligible image from a coded composite television signal broadcast from the transmitter of Figure 1. Intelligible reception may be obtained only by subscribing to the appropriate key signal from the central station 129.

In Figure 4, the coded composite television signal from the transmitter of Figure 1 is intercepted by an antenna 600 and is passed through a radio-frequency amplifier 601 to an oscillator-converter 602. Intermediate-frequency sound signals from oscillator-converter 602 are directed through a conventional sound channel comprising an intermediate-frequency amplifier 603 of one or more stages, a limiter-discriminator 604, audio-frequency and power-amplifiers 605, and a loudspeaker or sound-reproducing device 606. Intermediate-frequency video signals from oscillator-converter 602 are passed through any desired number of stages of intermediate-frequency amplification 607 to a video detector 608. The demodulated composite video signals from detector 608 are impressed between terminals 609 and 610 of decoding apparatus 611.

Central station 129 is coupled to a pair of terminals 612 and 613 of decoding apparatus 611 by means of a transmission line 614 and a key-frequency filter 615. As previously pointed out, central station 129 may comprise the central station of an existing telephone system; in order to permit simultaneous use of the facilities for telephone communication and for key signal reception, the subscriber's telephone hand-set 616 is coupled to line 614 through a speech-pass filter 617.

Decoding apparatus 611 operates in response to the key signal received from central station 129 at terminals 612 and 613 to produce decoding information and to combine such decoding information with the detected composite video signal appearing at terminals 609 and 610. A decoded composite television signal is produced at output terminals 618 and 619 of decoding apparatus 611, and the decoded composite television signal is passed through a second video amplifier 620 and impressed on the input circuit of an image-reproducing device 621 such as a cathode-ray tube or the like.

Decoding apparatus 611 also functions to direct the detected composite video signals to the synchronizing system associated with device 621. Detected composite video signals appear at terminals 622 and 623 of decoding apparatus 611 and are supplied to a synchronizing-signal separator 624 which drives a field-frequency sweep-signal generator 625 associated with a deflection coil 626 to provide field-frequency scanning for device 621. Positive-polarity field-frequency drive pulses from field-frequency sweep-signal generator 625 are supplied to terminals 627 and 628 of decoding apparatus 611. Line-frequency synchronizing-signal components from synchronizing-signal separator 624 are coupled to an automatic frequency control (AFC) phase detector 629, the latter being also coupled to a line-frequency oscillator 630. The output from AFC phase detector 629 is used to control the operating frequency of line-frequency oscillator 630 by means of a reactance tube 631. Line-frequency oscillator 630 drives a line-frequency sweep-signal generator 631 associated with a deflection coil 632 to provide line-frequency scanning for device 621. A sinusoidal line-frequency signal from line-frequency oscilaltor 630 is supplied to terminals 633 and 634 of decoding apparatus 611.

Decoding apparatus 611 also comprises a gated automatic gain control system for reducing the effect of extraneous disturbances on the operation of the receiver. To this end, automatic gain control potentials are produced at terminals 635 and 636 of decoding apparatus 611 and are supplied by means of leads 637 to radio-frequency amplifier 601 and to video intermediate-frequency amplifier 607. Decoding apparatus 611 also functions to provide positive-polarity line-frequency blanking pulses for application to the cathode of device 621. For this purpose, terminals 638 and 639 of decoding apparatus 611 are coupled respectively to the cathode of device 621 and to ground.

With the exception of decoding apparatus 611, all of the components of the receiver of Figure 4 may be of conventional construction. An illustrative embodiment of decoding apparatus 611 is disclosed in detail in Figures 5A, 5B, and 5C.

In Figure 5A, the key signal from the central station is applied between terminals 612 and 613, terminal 612 being coupled to the control grid 650 of an electron-discharge device 651 by means of a condenser 652, and terminal 613 being grounded. The cathode 653 of device 651 is coupled to ground through a resistor 654, and a condenser 655 is connected in shunt with resistor 654. The anode 656 of device 651 is coupled to B+ through a load resistor 657. Anode 656 is also coupled to ground through the series combination of a coupling condenser 658 and a parallel resonant circuit comprising a condenser 659 and an inductor 660. The series combination of a rectifier 661 and a resistor 662 is connected in parallel with the parallel resonant circuit, and the cathode of rectifier 661 is coupled to control grid 650 by means of series resistors 663 and 664 and shunt condensers 665 and 666.

Anode 656 of device 651 is coupled to the anode of a rectifier 667 by means of a resistor 668 and a condenser 669. The cathode of rectifier 667 is connected to ground. A condenser 670 is connected to ground from the junction of resistor 668 and condenser 669, and a resistor 671 is connected in parallel with rectifier 667.

The anode of rectifier 667 is coupled to the control grid 672 of an electron-discharge device 673 by means of a resistor 674. The cathode 675 of device 673 is coupled to ground through a resistor 676; and a condenser 677 is connected in parallel with resistor 676. Cathode 675 is also connected to B+ through a resistor 678. The anode 679 of device 673 is connected to B+ through a load resistor 680.

Terminals 627 and 628, from the field-frequency sweep-signal generator 625 (Figure 4), are coupled both to the input circuit and to the output circuit of device 673. Terminal 628 is directly connected to ground, and terminal 627 is coupled to control grid 672 by means of the series combination comprising two condensers 681 and 682 and a resistor 683. The junction between condensers 681 and 682 is coupled to anode 679 by means of a condenser 684 and a resistor 685, and is coupled to ground by means of a condenser 686.

Anode 679 of device 673 is coupled to the control grid 687 of an electron-discharge device 688 by means of a condenser 689, and a resistor 690 is connected between control grid 687 and ground. The cathode 691 of device 688 is connected to ground through a resistor 692. The anode 693 of device 688 is coupled to B+ through a load resistor 694.

Anode 693 of device 688 is also coupled to the control grid 695 of an electron-discharge device 696 by means of a condenser 697. The cathode 698 of device 696 is directly connected to cathode 691 of device 688, and a resistor 699 is connected between control grid 695 and cathode 698. The anode 700 of device 696 is coupled to B+ through a load resistor 701, and to control grid 687 of device 688 through a resistor 702.

Anode 700 of device 696 is coupled to ground through the series combination of a fixed resistor 705 and a potentiometer 706, and a movable tap 707 associated with potentiometer 706 is coupled to the first grid 708 of an electron-discharge device 709 through a battery 710. The cathode 711 of device 709 is grounded. The screen grid 712 of device 709 is coupled to B+ through a resistor 713 and to ground through the parallel combination of a resistor 714 and a condenser 715. A terminal 716, from a portion of the circuit yet to be described, is coupled to the third grid 717 of device 709 by means of a coupling condenser 718, and a second terminal 719 is grounded. The third grid 717 of device 709 is also returned to ground through the parallel combination of a resistor 720 and a rectifier 721. The anode 722 of device 709 is coupled to B+ through a load resistor 723; anode 722 is also connected to a terminal 865 for connection to a portion of the circuit yet to be described, and a second terminal 866 is grounded.

In another portion of the circuit, terminals 633 and 634 from line-frequency oscillator 630 (Figure 4) are coupled to the input circuit of an electron-discharge device 725. Terminal 633 is coupled to the control grid 726 of device 725 by means of a coupling condenser 727, and terminal 634 is grounded. A resistor 728 is connected between grid 726 and ground. The cathode 729 of device 725 is connected to ground through a resistor 730. The anode 731 of device 725 is coupled to B+ through a load resistor 732. The series combination of a fixed condenser 733 and a variable resistor 734 is connected between anode 731 and cathode 729, and the junction between condenser 733 and resistor 734 is coupled to the control grid 735 of a further electron-discharge device 736 by means of a coupling condenser 737 and the secondary winding 738 of a blocking transformer 739.

The cathode 740 of device 736 is directly connected to ground, and control grid 735 is returned to ground through a variable resistor 741. The anode 742 of device 736 is coupled to B+ through the primary winding 743 of blocking transformer 739.

Anode 742 is coupled to the control grid 744 of an electron-discharge device 745 by means of a coupling condenser 746, and control grid 744 is connected to ground through a resistor 747. The cathode 748 of device 745 is connected to ground through a resistor 749, and the anode 750 of device 745 is connected to B+ through a load resistor 751.

Anode 750 of device 745 is coupled to the control grid 752 of an electron-discharge device 753 by means of a coupling condenser 754. The cathode 755 of device 753 is directly connected to cathode 748 of device 745, and a resistor 756 is connected between control grid 752 and cathode 755. The anode 757 of device 753 is coupled to B+ through a load resistor 758. Anode 757 is directly connected to terminal 638 for application to the cathode of image-reproducing device 621 (Figure 4), and the other terminal 639 is grounded.

Anode 750 of device 745 is coupled to the control grid 759 of an electron-discharge device 760 by means of a coupling condenser 761, and control grid 759 is connected to ground through a resistor 762. Control electrode 759 is also connected to B+ through a resistor 763. The cathode 764 of device 760 is connected to ground through a resistor 765, and the anode 766 of device 760 is coupled to B+ through a load resistor 767.

Anode 722 of device 709 is coupled to cathode 764 of device 760 through a cathode follower comprising an electron-discharge device 768. Anode 722 is connected to the control grid 1110 of device 768, and grid 1110 is returned to ground through a resistor 1111 and a battery 1112. The anode 1113 of device 768 is connected to B+, and the cathode 1114 of that device is coupled to ground through a load resistor 1115. Cathode 1114 is directly connected to cathode 764 of device 760.

Anode 766 of device 760 is coupled to the control grid 769 of an electron-discharge device 770 by means of a coupling condenser 771, and a resistor 772 is connected between control grid 769 and ground. The cathode 773 of device 770 is connected to ground through a resistor 774, and the anode 775 of device 770 is connected to B+ through a load resistor 776. Anode 775 is also coupled to the control grid 777 of an electron-discharge device 778 by means of a coupling condenser 779. The cathode 780 of device 778 is directly connected to the cathode 773 of device 770, and a resistor 781 is connected between control grid 777 and cathode 780. The anode 782 of device 778 is connected to B+ through a load resistor 783.

Anode 782 is connected to ground through the series combination of a fixed resistor 784 and a potentiometer 785, a variable tap 786 of which is coupled to the first grid 787 of an electron-discharge device 788 by means of a coupling condenser 789. A resistor 790 is connected between first grid 787 and ground, and the cathode 791 of device 788 is directly grounded. The screen grid 792 of device 788 is connected to B+ through a resistor 793 and to ground through the parallel combination of a resistor 794 and a condenser 795.

Anode 722 of device 709 is coupled to the third grid 796 of device 788 by means of a coupling condenser 797, and third grid 796 is connected to ground through the parallel combination of a resistor 798 and a rectifier 799. The anode 800 of device 788 is connected to B+ through a load resistor 801.

Terminals 802 and 803, from a portion of the circuit yet to be described, are coupled to the input circuit of an electron-discharge device 804. Terminal 802 is coupled to the first grid 805 of device 804 by means of a coupling condenser 806, and terminal 803 is directly grounded. First grid 805 is connected to ground through the parallel combination of a resistor 807 and a diode 1102, and the cathode 808 of device 804 is directly connected to ground. The screen grid 809 of device 804 is connected to screen grid 712 of device 709, and the suppressor grid is directly connected to cathode 808. The anode 810 of device 804 is connected to anode 800 of device 788 and to a terminal 811 for connection to a portion of the circuit yet to be described. A second terminal 812 is grounded.

In Figure 5B, an electron-discharge device 815 is arranged in a self-oscillating circuit. The cathode 816 of device 815 is grounded, and the anode 817 of device 815 is connected to B+ through a resistor 818. A phase-shifting feedback path, comprising series condensers 819, 820, 821, and 822 and shunt resistors 823, 824, 825, and 826 is provided from anode 817 to the control grid 827 of device 815. Terminal 627 from field-frequency sweep-signal generator 625 (Figure 4) is connected to a point intermediate condensers 820 and 821 by means of a resistor 828, and terminal 628 is grounded.

Anode 817 of device 815 is coupled to the control grid 829 of an electron-discharge device 830 by means of a coupling condenser 831, and a resistor 832 is connected between control grid 829 and ground. The cathode 833 of device 830 is connected to ground through a resistor 834, and the anode 835 of device 830 is coupled to B+ through a load resistor 836. The series combination of a fixed condenser 837 and a variable resistor 838 is connected between anode 835 and cathode 833, and the junction between condenser 837 and resistor 838 is coupled to the control grid 839 of an electron-discharge device 840 through a coupling condenser 841 and the secondary winding 842 of a blocking transformer 843. Control grid 839 is returned to ground through a variable resistor 844, and the cathode 845 of device 840 is directly connected to ground. The anode 846 of device 840 is coupled to B+ through the primary winding 847 of transformer 843.

Anode 846 of device 840 is coupled to the control grid 848 of an electron-discharge device 849 by means of a coupling condenser 850, and a resistor 851 is connected between control grid 848 and ground. The cathode 852 of device 849 is coupled to ground through a resistor 853, and the anode 854 of device 849 is coupled to B+ through a load resistor 855. Anode 854 is also coupled to the control grid 856 of an electron-discharge device 857 by means of a condenser 858, and the cathode 859 of device 857 is directly connected to cathode 852 of device 849. A resistor 860 is connected between control grid 856 and cathode 859. The anode 861 of device 857 is connected to B+ through a load resistor 862. A terminal 863, for connection to a portion of the circuit yet to be described, is connected to anode 861, and a second terminal 864 is grounded.

Terminal 865, from the portion of the circuit shown in Figure 5A, is coupled to the control grid 867 of an electron-discharge device 868 by means of a coupling condenser 869, and a resistor 870 is coupled between grid 867 and ground. A diode direct-current restoration device 871 is connected in parallel with resistor 870. The anode 872 of device 868 is directly connected to B+, and the cathode 873 of that device is coupled to ground through a load resistor 874.

In another portion of the circuit, terminal 638, from Figure 5A, is coupled to the control grid 879 of an electron-discharge device 880 by means of a condenser 881 and a resistor 882, and terminal 639 is grounded. Control grid 879 is connected to ground through the parallel combination of a resistor 883 and a condenser 884. The cathode 885 of device 880 is directly grounded, and the anode 886 of device 880 is connected to B+ through a load resistor 887. Anode 886 is also coupled to the control grid 888 of an electron-discharge device 889 by means of a coupling condenser 890. The cathode 891 of device 889 is grounded, and a resistor 892 is connected between control grid 888 and cathode 891. The anode 893 of device 889 is connected to B+ by means of a load resistor 894.

Anode 893 of device 889 is coupled to the first grid 895 of an electron-discharge device 896 by means of a condenser 897, and a resistor 898 is connected between grid 895 and ground. The cathode 899 of device 896 is grounded. The screen grid 900 of device 896 is connected to B+ through a resistor 901 and to ground through the parallel combination of a resistor 902 and a condenser 903.

Cathode 873 of device 868 is coupled to the third grid 904 of device 896 by means of a condenser 905, and a resistor 906 is connected between grid 904 and ground. The anode 907 of device 896 is connected to B+ through the primary winding 908 of an output transformer 909. A terminal 910, from a portion of the circuit yet to be described, is also connected to third grid 904, and a second terminal 911 is grounded. A rectifier 912 is connected between terminals 910 and 911.

The secondary winding 913 of output transformer 909 is connected to the center terminals 914 and 915 of a bridge rectifier 916 by means of resistors 917 and 918 respectively; a battery 919 is connected in series with resistor 918 and secondary winding 913. Terminal 609 from video detector 608 (Figure 4) is directly connected to an outside terminal 920 of bridge rectifier 916, terminal 610 being grounded. The other outside terminal 921 of bridge rectifier 916 is coupled to ground through a condenser 922. The series combination of a condenser 923 and a resistor 924 is connected in parallel with condenser 922. Terminal 635, for connection to radio-frequency amplifier 601 and intermediate frequency amplifier 607 (Figure 4), is directly connected to terminal 921 of brige rectifier 916, and terminal 636 is grounded.

Terminal 921 of bridge rectifier 916 is also directly connected to the first grid 925 of an electron-discharge device 926, and a resistor 927 is connected between grid 925 and ground. The cathode 928 of device 926 is coupled to ground through the series combination of a resistor 929 and a battery 930. Terminal 811, from the portion of the circuit shown in Figure 5A, is coupled to cathode 928 through the parallel combination of a resistor 931 and a condenser 932, and terminal 812 is grounded. The screen grid 933 of device 926 is connected to B+ through a resistor 934 and is bypassed to ground by means of a condenser 935, and the suppressor grid of device 926 is grounded. The anode 936 of device 926 is connected to B+ by means of a load resistor 937.

Anode 936 of device 926 is coupled to ground through a potentiometer 939, a variable tap 940 of which is connected to the third grid 941 of an electron-discharge device 942 through a battery 943. The cathode 944 of device 942 is grounded, and the screen grid 945 of device 942 is connected to B+ through a resistor 946 and to ground through the parallel combination of a resistor 947 and a condenser 948. Terminal 609, from video detector 608 (Figure 4), is directly connected to the first grid 949 of device 942, and terminal 610 is grounded. The anode 950 of device 942 is connected to B+ through the series combination of a load resistor 951 and a peaking coil 952. Terminal 622, for connection to synchronizing-signal separator 624 (Figure 4), is directly connected to anode 950, and terminal 623 is grounded. Anode 950 is also coupled to terminal 618 by means of a condenser 953 for connection to second video amplifier 620 (Figure 4), and terminal 619 is grounded.

In Figure 5C, terminal 612, from central station 129 (Figure 4), is coupled to the first grid 954 of an electron-discharge device 955 by means of a condenser 956, and terminal 613 is grounded. A resistor 957 is connected between grid 954 and ground. The cathode 958 of device 955 is connected to ground through the parallel combination of a resistor 959 and a condenser 960. The screen grid 961 of device 955 is connected to B+ through a resistor 962 and to ground through the parallel combination of a resistor 963 and a condenser 964. The suppressor grid of device 955 is directly connected to cathode 958, and the anode 965 is connected to B+ through the tuned primary 966 of an output transformer 967.

The tuned secondary 968 of transformer 967 is coupled to the first grid 969 of an electron-discharge device 970 by means of a condenser 971, and a resistor 972 is connected between grid 969 and ground. The cathode 973 of device 970 is connected to ground through the parallel combination of a resistor 974 and a condenser 975. The screen grid 976 of device 970 is connected to B+ through a resistor 977 and to ground through the parallel combination of a resistor 978 and a condenser 979. The suppressor grid is directly connected to the cathode, and the anode 980 of device 970 is connected to screen grid 976 through the tuned primary 981 of a discriminator transformer 982, the tuned secondary 983 of which is connected between the anodes of a pair of diode rectifiers 984 and 985.

A resistor 986 is connected in parallel with diode 984, and a resistor 987 is connected in parallel with diode 985, the cathode of the latter diode being grounded. The parallel combination of a resistor 988 and a condenser 989 is connected between the cathodes of diodes 984 and 985.

The cathode of diode 984 is directly connected to the first grid 990 of an electron-discharge device 991, and a resistor 992 is connected between grid 990 and ground. The cathode 993 of device 991 is grounded, and the screen grid 994 of device 991 is connected to B+ through a resistor 995 and to ground through the parallel combination of a resistor 996 and a condenser 997. The suppressor grid is directly connected to the cathode, and the anode 998 of device 991 is connected to B+ by means of a load resistor 999.

Anode 998 of device 991 is coupled to the third grid 1000 of an electron-discharge device 1001 by means of a glow-discharge lamp 1002, and the series combination of a resistor 1003 and a battery 1004 is connected between grid 1000 and ground. The cathode 1005 of device 1001 is grounded, and the screen grid of device 1001 is connected to B+ through a resistor 1006 and to ground through the parallel combination of a resistor 1007 and a condenser 1008. Terminal 863, from the portion of the circuit shown in Figure 5B, is coupled to the first grid 1009 of device 1001 by means of a condenser 1010, and terminal 864 is grounded. A resistor 1011 and a battery 1100 are series-connected between grid 1009 and ground. Anode 1012 of device 1001 is connected to B+ by means of a load resistor 1013.

Anode 1012 of device 1001 is coupled to the control grid 1014 of an electron-discharge device 1015 by means of a coupling condenser 1016, and a resistor 1017 and a diode direct-current restoration device 1101 are connected in parallel between grid 1014 and ground. The cathode 1018 of device 1015 is connected to ground through a resistor 1019. The anode 1020 of device 1015 is connected to B+ through a variable load resistor 1021. Terminal 802, for connection to the portion of the circuit shown in Figure 5A, is directly connected to anode 1020, and terminal 803 is grounded.

Control grid 1014 of device 1015 is directly connected to the control grid 1022 of an electron-discharge device 1023, the anode 1024 of which is directly connected to B+. The cathode 1025 of device 1023 is connected to ground through a resistor 1026. Terminal 910, for connection to the portion of the circuit shown in Figure 5B, is coupled to cathode 1025 by means of a condenser 1027, and terminal 911 is grounded.

The operation of the decoding apparatus represented schematically by Figures 5A, 5B, and 5C may best be understood by a consideration of those figures in conjunction with the idealized graphical waveform representations of Figures 6A, 6B, and 6C.

With particular reference to Figures 5A and 6A, a line-frequency sinusoidal signal 50 is applied to the input circuit of electron-discharge device 725 from oscillator 630 of Figure 4. Device 736 is arranged as a blocking oscillator, and resistor 734 is adjusted to shift the phase of sinusoidal input signal 50 so that blocking oscillator 736 is triggered to produce positive-polarity output pulses in time coincidence with the transmitted line-frequency blanking pulses. The phase-shifted sinusoidal wave is illustrated as waveform 51, and the blocking oscillator output, appearing at anode 742, is exemplified by waveform 52.

Devices 745 and 753 and their associated circuit elements are arranged to function as a line-frequency multivibrator which is triggered by the positive pulses of the blocking oscillator output 52, and the multivibrator is constructed and arranged to produce line-frequency blanking pulses of the proper duration. Positive-polarity line-frequency blanking pulses 53 are produced at anode 757 of device 753 and are applied to terminals 638 for application to the cathode of picture reproducing device 621 (Figure 4) to blank that device during line retrace intervals.

Negative-polarity line-frequency blanking pulses, represented by waveform 54, appear at anode 750 of device 745 and are applied to the input circuit of device 760.

With particular reference now to Figures 5A and 6B, the key signal 23 from central station 129 (Figure 4) is applied to the input circuit of device 651. Device 651 and its associated circuit elements are arranged to function as a key-signal amplifier and rectifier, and a feedback path is provided between anode 656 and control grid 650 to provide increased gain. High-frequency key-signal components are bypassed to ground by means of condenser 670, and the amplified rectified key signal envelope 55 is applied to the control grid 672 of device 673.

At the same time, field-frequency drive pulses of positive polarity, represented by waveform 56, are applied from field-frequency sweep-signal generator 625 (Figure 4) to control grid 672 of device 673, so that the composite input signal to device 673 is represented by waveform 57. Positive-polarity field-frequency drive pulses are also applied to anode 679 of device 673, and resistors 683, 674, and 671 are so proportioned that the amplitudes of the pulses applied respectively to grid 672 and to anode 679 are related by a factor equal to one-half the amplification factor of device 673. Control grid 672 is biased, by means of resistors 676 and 678, to cut off at a voltage, represented for example by line 1050 in waveform 57, such that device 673 passes space current only during intervals when the line-frequency synchronizing-signal components and video-frequency components of the received signal are not coded (i. e., intervals when the key-signal 23 is of maximum amplitude). The output voltage developed across resistor 680, represented by waveform 58, comprises alternate series of positive-polarity and negative-polarity pulses of equal amplitude and individually of time duration equal to that of each field-frequency drive pulse.

Devices 688 and 696 are arranged to function as a single-shot multivibrator, and signal 58 from device 673 is impressed on control grid 687 of device 688. Device 688 is normally non-conductive and is rendered conductive by the first one of each series of positive-polarity pulses from anode 679 of device 673. Similarly, the first one of each series of negative-polarity pulses renders device 688 once again non-conductive and causes device 696 to conduct, thereby reducing the potential of anode 700.

The output signal appearing across resistor 701, represented by waveform 59, is adjusted in amplitude by means of variable tap 707 on potentiometer 706 and is applied to the first grid 708 of a gating device 709. At the same time, field-frequency pedestal pulses of negative polarity, represented by waveform 60, are applied to the third grid of device 709 from the portion of the circuit shown in Figure 5B. The first grid 708 is biased to cut off at a voltage intermediate the maximum positive and negative values of signal 59, this cut-off potential being represented in waveform 59 by means of line 1051. Similarly, the third grid 717 is biased to cut off at a voltage intermediate the maximum positive and negative values of the field-frequency pedestal pulses 60, this cut-off value being represented by line 1052 of waveform 60. In this manner, device 709 is caused to pass space current to anode 722 only during those intervals when both grids are more positive than the cut-off potentials 1051 and 1052.

The output signal developed across load resistor 723, represented by waveform 61, comprises a series of negative-polarity pulses 1053, 1054, 1055, and 1056 which are in time coincidence with respective field-scanning intervals of the received signal. Signal 61 is a first decoding signal and is complementary to the first coding signal 31 (Figure 3B) used at the transmitter to code the broadcast signals. This first decoding signal 61 appears between terminals 865 and 866 for use in another portion of the circuit.

With reference now to Figures 5C and 6B, key signal 23 is also applied to the input circuit of device 955, which serves as an amplifier. The amplified output appearing across tuned primary 966 of output transformer 967 is translated to the input circuit of device 970, which functions as an amplitude limiter of well-known construction. The output signal 62 appearing at anode 980 of device 970 comprises a constant-amplitude signal which varies in frequency between two predetermined frequencies to indicate the intervals during which the field-frequency synchronizing-signal components of the received composite television signal are coded. Amplitude-limited signal 62 is demodulated by means of discriminator transformer 982 and diodes 984 and 985, and the demodulated output 63 of the frequency detector is applied to the input of device 991 for amplification and phase inversion. The inverted signal is represented by waveform 64.

With reference now to Figures 5A and 6C, first decoding signal 61 is translated by cathode follower 768 to cathode 764 of device 760. At the same time, negative-polarity line-frequency blanking pulses 54 are simultaneously applied to control grid 759 of device 760. The circuit is constructed and arranged so that device 760 is conductive only when the first decoding signal 61 applied to cathode 764 is more negative than a predetermined cut-off voltage 1058. Consequently, the voltage developed across resistor 767 comprises a series of positive-polarity pulses during intervals when the first decoding signal 61 is at its maximum negative value. Each of these positive pulses is of a time duration corresponding to that of an individual line-frequency blanking pulse.

The signal appearing at anode 766 of device 760 is differentiated by condenser 771 and resistor 772, and the differentiated signal is supplied to a pulse generator of the multivibrator type, comprising devices 770 and 778, which operates to produce across resistor 783 a second decoding signal 66 comprising positive-polarity pulses of equal amplitude and individually of a time duration slightly greater than and of occurrence corresponding to those of the received suppressed line-frequency synchronizing-signal components. Second decoding signal 66 is complementary to the second coding signal 33 (Figure 3C) used at the transmitter to code the line-frequency synchronizing-signal components.

With reference to Figures 5B and 6C, device 815 is arranged as a field-frequency oscillator to supply a field-frequency sinusoidal signal. Device 830 functions as an amplifier and phase shifter, device 840 as a blocking oscillator, and devices 849 and 857 as a multivibrator; these circuits operate in essentially the same manner as the corresponding devices 725, 736, and 745, 753 in Figure 5A to provide field-frequency pedestal pulses 67 of positive polarity between terminals 863 and 864.

With reference to Figures 5C and 6C once again, the positive-polarity field-frequency pedestal pulses, represented by waveform 67, are applied to the first grid of device 1001, while signal 64 corresponding to the frequency-demodulated key signal is applied to the third grid of that device. Third grid 1000 of device 1001 is biased by means of battery 1004 to cut off at a voltage intermediate the maximum positive and negative values, represented for example by line 1059 in waveform 64, of the applied signal, and grid 1009 is biased by battery 1100 to cut off at a voltage represented by line 1060 in waveform 67. Consequently, device 1001 serves to develop negative-polarity pulses across resistor 1013 only during those intervals when signal 64 is at its maximum positive value; the signal developed across resistor 1013 is represented by waveform 68. This signal is inverted by device 1015, and the inverted signal 69 comprises a series of positive polarity pulses constituting a third decoding signal which is complementary to the third coding signal 35 (Figure 3C) used at the transmitter to code the field-frequency synchronizing-signal components.

Line-frequency blanking pulses 53 are applied to the input circuit of device 880 (Figure 5B) after integration by the network comprising resistor 882 and condenser 884. Device 880 operates as a clipper by virtue of the self-biasing action of resistor 883 and condenser 884 to develop across load resistor 887 a signal corresponding to the top portion of the integrated line-frequency blanking pulses. Device 889 operates as a bottom clipper to provide across resistor 894 a signal comprising positive-polarity pulses which are delayed and shortened relative to the incoming line-frequency blanking pulses. Condenser 897 and resistor 898 serve to differentiate the shortened and delayed pulses, and the differentiated signal is applied to the first grid 895 of device 896.

Signal 68 and signal 61 are also translated to electron-discharge device 896 of Figure 5B without change in polarity to provide gating information for device 896, so that output pulses appear across primary winding 908 only when the synchronizing-signal components of the incoming coded composite television signal are not suppressed. These output pulses are translated to secondary winding 913 and are utilized as gating information for the gated automatic gain control system comprising bridge rectifier 916. The automatic gain control voltage appears between terminals 635 and 636 for application to preceding receiver stages in a manner well known in the art.

With reference again to Figures 5A and 6C, the third decoding signal 69 is applied to the input circuit of device 804, and direct-current restoration is effected by means of diode 1102. First and second decoding signals 61 and 66 are applied to respective input grids of device 788. Devices 788 and 804 are connected with a common output load impedance 801, and the signal 70 appearing across resistor 801 represents the amplified algebraic sum of the three decoding signals 61, 66, and 69. The composite decoding signal 70 so formed is complementary to the composite coding signal 36 (Figure 3C) used at the transmitter.

In Figure 5B, the composite decoding signal 70 is applied to the input circuit of device 926, which functions as a controlled-gain amplifier. An adjustable portion of the output voltage developed across resistor 937 is applied to the input of device 942, while the detected composite television signal from video detector 608 is applied to another input grid of device 942. This device and its associated circuit elements function as a mixer. The amplitude of decoding signal 70 is adjusted by means of variable tap 940 on potentiometer 939 so that the applied decoding signal is of exactly the proper amplitude to compensate for the coding signal which was superposed on the uncoded composite television signal at the transmitter. The output appearing across resistor 951 and peaking coil 952 therefore represents a decoded composite television signal which is then coupled to the second video amplifier 620 (Figure 4) in the conventional manner.

The decoding apparatus illustrated in detail in Figures 5A, 5B, and 5C is constructed and arranged to allow reception of uncoded composite television signals, if desired, without disconnecting the decoding apparatus. In the reception of an uncoded composite television signal, no key signal is received over the wire lines 614 from central station 129 (Figure 4), so that the majority of the operating components of the decoding apparatus are quiescent. However, line-frequency blanking pulses are still produced in the decoding apparatus and serve as gating pulses for the automatic gain control circuits. Thus, the receiver is adapted for use in a location in which both coded and uncoded composite television signals are broadcast on different channels, or in which both coded and uncoded composite television signals are broadcast on a single channel at different times.

It is to be clearly understood that the waveforms used to describe the operation of the illustrated embodiment of the invention are idealized and are not all drawn to the same scale, in order to avoid crowding the drawings; the illustrated waveforms are qualitatively, although not quantitatively, accurate. Furthermore, it is contemplated that the number of components required for the coding apparatus at the transmitter and the decoding apparatus at the receiver may be reduced by combining multiple functions in a single stage wherever practicable.

While a particular embodiment of the present invention has been shown and described, it is apparent that various changes and modifications may be made, and it is therefore contemplated in the appended claims to cover all such changes and modifications as fall within the true spirit and scope of the invention.

I claim:

1. A subscription-type television system comprising: a television transmitter including a video-frequency signal generator, a scanning system for controlling said generator to develop during recurrent trace intervals video-frequency signals of varying amplitude within a predetermined amplitude-range representing a scanned subject, a timing-signal generator included in said scanning system for developing timing signals during interposed intervals, a mixer device coupled to said video-frequency generator and to said scanning system for producing a composite television signal including said video-frequency signals and said timing signals with said timing signals normally having a fixed peak amplitude greater than any amplitude within said range, coding apparatus including a first pulse generator for developing during spaced time intervals a first coding signal comprising pulses of one polarity, a second pulse generator for developing during said spaced time intervals a second coding signal comprising pulses, in substantial time coincidence with said interposed intervals, of polarity opposite to said one polarity and of an amplitude greater than that of said first coding signal, means for superposing said first and second coding signals on said composite television signal to provide a coded television signal, means for transmitting said coded television signal and a television receiver comprising decoding apparatus including a third pulse generator, means for actuating said third pulse generator to develop during said spaced time intervals a first decoding signal substantially complementary with said first coding signal, a fourth pulse generator, means for actuating said fourth pulse generator to develop during said spaced time intervals a second decoding signal substantially complementary with said second coding signal, means for superposing said first and second decoding signals on said coded television signal to provide a decoded composite television signal, and means for utilizing said decoded television signal to reproduce an image of said scanned subject.

2. The method of encoding a composite television signal including video-frequency components of varying amplitude and recurrent synchronizing-signal components, which method comprises: translating said video-frequency components within an amplitude range less than the total amplitude range of said composite television signal; translating said synchronizing-signal components within an amplitude range outside that of said video-frequency components during spaced timed intervals; and reducing said synchronizing-signal components to an amplitude within the amplitude range of said video-frequency components during intervening time intervals.

3. The method of encoding a composite television signal including video-frequency components of varying amplitude within a predetermined amplitude-range and synchronizing-signal components of fixed peak amplitude greater than any amplitude within said range, which method comprises: reducing the peak amplitude of said synchronizing-signal components to a value within said range during spaced time intervals; and increasing the amplitude of said video-frequency components to a maximum value above said range but no greater than said fixed peak amplitude during said spaced time intervals.

4. The method of encoding a composite television signal including video-frequency components of varying amplitude within a predetermined amplitude-range and two sets of synchronizing-signal components of fixed peak amplitude greater than any amplitude within said range, which method comprises: reducing the peak amplitude of one of said sets of synchronizing-signal components to a value within said range during one group of spaced time intervals; and reducing the peak amplitude of the other of said sets of synchronizing-signal components to a value within said range during a second group of differently spaced time intervals overlapping said first group.

5. The method of encoding a composite television signal including video-frequency components of varying amplitude within a predetermined amplitude-range and interposed line-frequency and field-frequency synchronizing-signal components of fixed peak amplitude greater than any amplitude within said range, which method comprises: reducing the peak amplitude of said line-frequency synchronizing-signal components to a value within said range and increasing the amplitude of said video-frequency components to a value above said range but no greater than said fixed peak amplitude during a first group of spaced time intervals; and reducing the peak amplitude of said field-frequency synchronizing signal components to a value within said range during a second group of differently spaced time intervals overlapping said first group.

6. In a subscription-type television transmitter: a video-frequency signal generator; a scanning system for controlling said generator to develop during recurrent trace intervals video-frequency signals of varying amplitude within a predetermined amplitude-range; a timing-signal generator included in said scanning system for developing timing signals during interposed intervals; a mixer device coupled to said video-frequency generator and to said scanning system for producing a composite television signal including said video-frequency signals and said timing signals with said timing signals normally having a fixed peak amplitude greater than any amplitude within said range; coding apparatus including a first pulse generator for developing during spaced time intervals a first coding signal comprising pulses of one polarity, a second pulse generator for developing during said spaced time intervals a second coding signal comprising pulses, in substantial time coincidence with said interposed intervals, of polarity opposite to said one polarity and of an amplitude greater than that of said first coding signal, and means for superposing said first and second coding signals on said composite television signal to provide a coded television signal; and means for transmitting said coded television signal.

7. In a subscription-type television transmitter: a video-frequency signal generator; a scanning system for controlling said generator to develop during recurrent trace intervals video-frequency signals of varying amplitude within a predetermined amplitude-range; a timing-signal generator included in said scanning system for developing timing signals during interposed intervals; a mixer device coupled to said video-frequency generator and to said scanning system for producing a composite television signal including said video-frequency signals and said timing signals with said timing signals normally having a fixed peak amplitude greater than any amplitude within said range; coding apparatus including a first pulse generator for developing during randomly spaced time intervals of random duration a first coding signal comprising pulses of one polarity, a second pulse generator for developing during said spaced time intervals a second coding signal comprising pulses, in substantial time coincidence with said interposed intervals, of polarity opposite to said one polarity and of an amplitude greater than that of said first coding signal, and means for superposing said first and second coding signals on said composite television signal to provide a coded television signal; and means for transmitting said coded television signal.

8. In a subscription-type television transmitter: a video-frequency signal generator; a scanning system for controlling said generator to develop during recurrent trace intervals video-frequency signals of varying amplitude within a predetermined amplitude-range; a timing-signal generator included in said scanning system for developing timing signals during interposed intervals; a mixer device coupled to said video-frequency generator and to said scanning system for producing a composite television signal including said video-frequency signals and said timing signals with said timing signals normally having a fixed peak amplitude greater than any amplitude within said range; coding apparatus including a first pulse generator for developing during spaced time intervals a first coding signal comprising pulses of one polarity, a second pulse generator for developing during said spaced time intervals a second coding signal comprising pulses, in substantial time coincidence with said interposed intervals, of polarity opposite to said one polarity and of an amplitude greater than that of said first coding signal, means for combining said first and second coding signals to provide a compound coding signal, and means for superposing said compound coding signal on said composite television signal to provide a coded television signal; and means for transmitting said coded television signal.

9. In a subscription-type television transmitter: a video-frequency signal generator; a scanning system for controlling said generator to develop during recurrent trace intervals video-frequency signals of varying amplitude within a predetermined amplitude-range; a timing-signal generator included in said scanning system for developing timing signals during interposed intervals; a mixer device coupled to said video-frequency generator and to said scanning system for producing a composite television signal including said video-frequency signals and said timing signals with said timing signals normally having a fixed peak amplitude greater by a predetermined amount then the maximum amplitude within said range; coding apparatus including a first pulse generator for developing during spaced time intervals a first coding signal comprising pulses of one polarity, a second pulse generator for developing during said spaced time intervals a second coding signal comprising pulses, in substantial time coincidence with said interposed intervals, of polarity opposite to said one polarity and of an amplitude at least as great as the sum of that of said first coding signal and said predetermined amount, and means for superposing said first and second coding signals on said composite television signal to provide a coded television signal; and means for transmitting said coded television signal.

10. In a subscription-type television transmitter: a video-frequency signal generator; a scanning system for controlling said generator to develop during recurrent trace intervals video-frequency signals of varying amplitude within a predetermined amplitude-range; a timing-signal generator included in said scanning system for developing during interposed intervals timing signals comprising line-frequency and field-frequency synchronizing-signal components; a mixer device coupled to said video-frequency generator and to said scanning system for producing a composite television signal including said video-frequency signals and said timing signals with said timing signals normally having a fixed peak amplitude greater than any amplitude within said range; coding apparatus including a first pulse generator for developing during a first group of spaced time intervals a first coding signal comprising pulses of one polarity, a second pulse generator for developing during said first group of spaced time intervals a second coding signal comprising pulses, in substantial time coincidence with said line-frequency synchronizing-signal components, of polarity opposite to said one polarity and of an amplitude greater than that of said first coding signal, a third pulse generator for developing during a second group of differently spaced time intervals a third coding signal comprising pulses of said opposite polarity in substantial time coincidence with said field-frequency synchronizing-signal components, and means for superposing all of said coding signals on said composite television signal to provide a coded television signal; and means for transmitting said coded television signal.

11. In a subscription-type television transmitter: a video-frequency signal generator; a scanning system for controlling said generator to develop during recurrent trace intervals video-frequency signals of varying amplitude within a predetermined amplitude-range; a timing-signal generator included in said scanning system for developing during interposed intervals timing signals comprising line-frequency and field-frequency synchronizing-signal components; a mixer device coupled to said video-frequency generator and to said scanning system for producing a composite television signal including said video-frequency signals and said timing signals with said timing signals normally having a fixed peak amplitude greater by a predetermined amount than the maximum amplitude within said range; coding apparatus including a first pulse generator for developing during a first group of spaced time intervals a first coding signal comprising pulses of one polarity and of an amplitude no greater than the difference between said fixed peak amplitude and the maximum amplitude within said range, a second pulse generator for developing during said first group of spaced time intervals a second coding signal comprising pulses, in time coincidence with said line-frequency synchronizing-signal components, of polarity opposite to said one polarity and of an amplitude at least as great as the sum of said first coding signal amplitude and said predetermined amount, a third pulse generator for developing during a second group of differently spaced time intervals a third coding signal comprising pulses, in substantial time coincidence with said field-frequency synchronizing-signal components, of said opposite polarity and of an amplitude at least as great as said difference, and means for superposing all of said coding signals on said composite television signal to provide a coded television signal; and means for transmitting said coded television signal.

12. In a subscription-type television transmitter: a video-frequency signal generator; a scanning system for controlling said generator to develop during recurrent trace intervals video-frequency signals of varying amplitude within a predetermined amplitude-range; a timing-signal generator included in said scanning system for developing during interposed intervals timing signals comprising line-frequency and field-frequency synchronizing-signal components; a mixer device coupled to said video-frequency generator and to said scanning system for producing a composite television signal including said video-frequency signals and said timing signals with said timing signals normally having a fixed peak amplitude greater by a predetermined amount than the maximum amplitude within said range; coding apparatus including a first pulse generator for developing during a first group of spaced time intervals a first coding signal comprising pulses of one polarity and of an amplitude no greater than the difference between said fixed peak amplitude and the maximum amplitude within said range, a second pulse generator for developing during said first group of spaced time intervals a second coding signal comprising pulses, in substantial time coincidence with said line-frequency synchronizing-signal components, of polarity opposite to said one polarity and of an amplitude at least as great as the sum of said first coding signal amplitude and said predetermined amount, a third pulse generator for developing during a second group of differently spaced time intervals a third coding signal comprising pulses, in substantial time coincidence with said field-frequency synchronizing-signal components, of said opposite polarity and of an amplitude at least as great as said difference, means for combining said first, second and third coding signals to provide a compound coding signal, and means for superposing said compound coding signal on said composite television signal to provide a coded television signal; and means for transmitting said coded television signal.

13. A subscription-type television transmitter comprising: means for generating a composite television signal including video-frequency signals and line-frequency and field-frequency synchronizing-signals interspersed in time sequence in accordance with a predetermined plan; coding apparatus for altering two different characteristics of said composite television signal during two different overlapping groups of spaced time intervals; a key-signal generator for developing a key signal; means coupled to said key-signal generator and coordinated with said coding apparatus for modulating two different characteristics of said key signal to indicate respectively the times of occurrence of said different groups of spaced time intervals; and means for transmitting said coded television signal and said modulated key signal.

14. A subscription-type television transmitter comprising: a video-frequency signal generator; a scanning system for controlling said generator to develop during recurrent trace intervals video-frequency signals of varying amplitude within a predetermined amplitude-range; a timing-signal generator included in said scanning system for developing during interposed intervals timing signals comprising line-frequency and field-frequency synchronizing-signal components; a mixer device coupled to said video-frequency generator and to said scanning system for producing a composite television signal including said video-frequency signals and said timing signals with said timing signals normally having a fixed peak amplitude greater than any amplitude within said range; coding apparatus including a first pulse generator for developing during a first group of spaced time intervals a first coding signal comprising pulses of one polarity, a second pulse generator for developing during said first group of spaced time intervals a second coding signal comprising pulses, in substantial time coincidence with said line-frequency synchronizing-signal components, of polarity opposite to said one polarity and of an amplitude greater than that of said first coding signal, a third pulse generator for developing during a second group of differently spaced time intervals a third coding signal comprising pulses of said opposite polarity in substantial time coincidence with said field-frequency synchronizing-signal components, and means for superposing all of said coding signals on said composite television signal to provide a coded television signal; a key-signal generator for developing a key signal; means for modulating one characteristic of said key signal to indicate the times of occurrence of said first group of said spaced time intervals; means for modulating another characteristic of said key signal to indicate the times of occurrence of said second group of spaced time intervals; and means for transmitting said coded television signal and said key signal.

15. A subscription-type television transmitter comprising: a video-frequency signal generator; a scanning system for controlling said generator to develop during recurrent trace intervals video-frequency signals of varying amplitude within a predetermined amplitude-range; a timing-signal generator included in said scanning system for developing during interposed intervals timing signals comprising line-frequency and field-frequency synchronizing-signal components; a mixer device coupled to said video-frequency generator and to said scanning system for producing a composite television signal including said video-frequency signals and said timing signals with said timing signals normally having a fixed peak amplitude greater than any amplitude within said range; coding apparatus including a first pulse generator for developing during a first group of spaced time intervals a first coding signal comprising pulses of one polarity, a second pulse generator for developing during said first group of spaced time intervals a second coding signal comprising pulses, in substantial time coincidence with said line-frequency synchronizing-signal components, of polarity opposite to said one polarity and of an amplitude greater than that of said first coding signal, a third pulse generator for developing during a second group of differently spaced time intervals a third coding signal comprising pulses of said opposite polarity in substantial time coincidence with said field-frequency synchronizing-signal components, and means for superposing all of said coding signals on said composite television signal to provide a coded television signal; a key-signal generator for developing a key signal; means for modulating the amplitude of said key signal to indicate the times of occurrence of said first group of spaced time intervals; means for modulating the frequency of said key signal to indicate the times of occurrence of said second group of spaced time intervals; and means for transmitting said coded television signal and said key signal.

16. In a subscription-type television receiver for utilizing a composite television signal comprising video-frequency signals and interposed timing signals, which composite television signal is coded during spaced time intervals in such manner that, during said spaced time intervals, said video-frequency signals are of increased amplitude and said timing signals are of reduced amplitude relative to their respective amplitudes during normal transmission, and for simultaneously utilizing a key signal indicating the times of occurrence of said spaced time intervals, decoding apparatus comprising: a first pulse generator; means responsive to said key signal for actuating said first pulse generator to develop during said spaced time intervals a first decoding signal comprising pulses of one polarity; a second pulse generator; means responsive to said key signal for actuating said second pulse generator to develop during said spaced time intervals a second decoding signal comprising pulses, in substantial time coincidence with said timing signals, of polarity opposite to said one polarity and of an amplitude greater than that of said first decoding signal; and means for superposing said first and second decoding signals on said coded television signal to provide a decoded composite television signal.

17. In a subscription-type television receiver for utilizing a composite television signal comprising video-frequency signals and interposed timing signals, which composite television signal is coded during spaced time intervals in such manner that, during said spaced time intervals, said video-frequency signals are of increased amplitude and said timing signals are of reduced amplitude relative to their respective amplitudes during normal transmission, and for simultaneously utilizing a key signal indicating the times of occurrence of said spaced time intervals, decoding apparatus comprising: a first pulse generator; means responsive to said key signal for actuating said first pulse generator to develop during said spaced time intervals a first decoding signal comprising pulses of one polarity; a second pulse generator; means responsive to said key signal for actuating said second pulse generator to develop during said spaced time intervals a second decoding signal comprising pulses, in substantial time coincidence with said timing signals, of polarity opposite to said one polarity and of an amplitude greater than that of said first decoding signal; means for algebraically combining said first and second decoding signals to provide a compound decoding signal; and means for superposing said compound decoding signal on said coded television signal to provide a decoded composite television signal.

18. In a subscription-type television receiver for utilizing a composite television signal comprising video-frequency signals and interposed timing signals including line-frequency and field-frequency synchronizing-signal components, which composite television signal is coded in such manner that, during a first group of spaced time intervals, said video-frequency signals are of increased amplitude and said line-frequency synchronizing-signal components are of reduced amplitude relative to their respective amplitudes during normal transmission, and, during a second group of spaced time intervals, said field-frequency synchronizing-signal components are of reduced amplitude relative to their amplitude during normal transmission, and for simultaneously utilizing a key signal indicating the times of occurrence of said groups of spaced time intervals, decoding apparatus comprising a first pulse generator; means responsive to said key signal for actuating said first pulse generator to develop during said first group of spaced time intervals a first decoding signal comprising pulses of one polarity; a second pulse generator; means responsive to said key signal for actuating said second pulse generator to develop during said first group of spaced time intervals a second decoding signal comprising pulses, in substantial time coincidence with said line-frequency synchronizing-signal components, of polarity opposite to said one polarity and of an amplitude greater than that of said first decoding signal; a third pulse generator; means responsive to said key signal for actuating said third pulse generator to develop during said second group of spaced time intervals a third decoding signal comprising pulses of said opposite polarity in substantial time coincidence with said field-frequency synchronizing-signal components; and means for superposing all of said decoding signals on said coded television signal to provide a decoded television signal.

19. In a subscription-type television receiver for utilizing a composite television signal comprising video-frequency signals representing a scanned subject and interposed timing signals including line-frequency and field-frequency synchronizing-signal components, which composite television signal is coded in such manner that, during a first group of spaced time intervals, said video-frequency signals are of increased amplitude and said line-frequency synchronizing-signal components are of reduced amplitude relative to their respective amplitudes during normal transmission, and, during a second group of spaced time intervals, said field-frequency synchronizing-signal components are of reduced amplitude relative to their amplitude during normal transmission, and for simultaneously utilizing a key signal which is amplitude-modulated to indicate the times of occurrence of said first group of spaced time intervals and angle-modulated to indicate the times of occurrence of said second group of spaced time intervals, decoding apparatus comprising: a first pulse generator; means including an amplitude-modulation detector and responsive to said key signal for actuating said first pulse generator to develop during said first group of spaced time intervals a first decoding signal comprising pulses of one polarity; a second pulse generator; means including said amplitude-modulation detector and responsive to said key signal for actuating said second pulse generator to develop during said first group of spaced time intervals a second decoding signal comprising pulses, in substantial time coincidence with said line-frequency synchronizing-signal components, of polarity opposite to said one polarity and of an amplitude greater than that of said first decoding signal; a third pulse generator; means including an angle-modualtion detector and responsive to said key signal for actuating said third pulse generator to develop during said second group of spaced time intervals a third decoding signal comprising pulses of said opposite polarity in substantial time coincidence with said field-frequency synchronizing-signal components; and means for algebraically superposing all of said decoding signals on said coded television signal to provide a decoded composite television signal.

20. In a subscription-type television receiver for utilizing a composite television signal, two different characteristics of which composite television signal are altered during two different overlapping groups of spaced time intervals, and for simultaneously utilizing a key signal, two different characteristics of which key signal are modulated to indicate respectively the times of occurrence of said different groups of spaced time intervals, decoding apparatus comprising: means including at least one detector for demodulating said key signal to derive a pair of control signals respectively indicating the times of occurrence of said different groups of spaced time intervals; means responsive to one of said control signals for developing during said first group of spaced time intervals a first decoding signal; means responsive to the other of said control signals for developing during said second group of spaced time intervals a second decoding signal; and means for operating with said first and second decoding signals on said coded television signal to provide a decoded composite television signal.

21. In a subscription-type television receiver for utilizing a composite television signal, two different characteristics of which composite television signal are altered during two different overlapping groups of spaced time intervals, and for simultaneously utilizing a key signal, said key signal being amplitude-modulated to indicate the times of occurrence of one of said groups of spaced time intervals and being angle-modulated to indicate the times of occurrence of the other of said groups of spaced time intervals, decoding apparatus comprising: means including an amplitude-modulation detector and responsive to said key signal for developing during said one group of spaced time intervals a first decoding signal; means including an angle-modulation detector and responsive to said key signal for developing during said other group of spaced time intervals a second decoding signal; and means for operating with said first and second decoding signals on said coded television signal to provide a decoded composite television signal.

References Cited in the file of this patent

UNITED STATES PATENTS

| | | |
|---|---|---|
| 2,401,405 | Bedford | June 4, 1946 |
| 2,402,058 | Loughren | June 11, 1946 |
| 2,403,059 | Dillenback, Jr. | July 2, 1946 |
| 2,403,540 | Meneley | July 9, 1946 |
| 2,487,682 | Wendt | Nov. 8, 1949 |
| 2,510,046 | Ellett et al. | May 30, 1950 |
| 2,612,552 | Crotty | Sept. 30, 1952 |

FOREIGN PATENTS

| | | |
|---|---|---|
| 406,672 | Great Britain | Feb. 28, 1934 |
| 423,098 | Great Britain | Jan. 25, 1935 |

OTHER REFERENCES

"Television Engineering" by Wilson, pages 334 and 335; published by Sir Isaac Pitman and Sons, Ltd., London, 1937.